US012783727B2

(12) United States Patent
Venkatesh et al.

(10) Patent No.: US 12,783,727 B2
(45) Date of Patent: Nov. 3, 2026

(54) CONSISTENTLY ANONYMIZED SENSITIVE DATA KNOWLEDGE GRAPH FOR RETRIEVAL AUGMENTED GENERATION

(71) Applicant: Cisco Technology, Inc., San Jose, CA (US)

(72) Inventors: Vasudha Venkatesh, Sunnyvale, CA (US); Eva Hamburger, Raleigh, NC (US); Reshmi Raj Chittette Rajappan, Cary, NC (US); Saurabh Sharma, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 19/090,262

(22) Filed: Mar. 25, 2025

(65) Prior Publication Data

US 2026/0300544 A1 Oct. 1, 2026

(51) Int. Cl.
*G06F 21/62* (2013.01)

(52) U.S. Cl.
CPC ................................ *G06F 21/6254* (2013.01)

(58) Field of Classification Search
CPC ................................................... G06F 21/6254
See application file for complete search history.

(56) References Cited

U.S. PATENT DOCUMENTS

| | | | | |
|---|---|---|---|---|
| 10,755,810 | B2 * | 8/2020 | Buckler | G16H 30/40 |
| 12,073,000 | B2 * | 8/2024 | Larson | G06N 20/00 |
| 12,554,888 | B2 * | 2/2026 | Gomez | G06F 21/6254 |
| 2017/0330236 | A1 * | 11/2017 | Quintero | G06Q 30/0234 |

(Continued)

FOREIGN PATENT DOCUMENTS

| | | | |
|---|---|---|---|
| CN | 118626603 | A | 9/2024 |
| WO | 2024182821 | A2 | 9/2024 |

OTHER PUBLICATIONS

Winter J., "Data Pipelines for RAG", amazee.io, Nov. 20, 2024, Retrieved from https://www.amazee.io/blog/post/data-pipelines-for-rag on Dec. 26, 2024, pp. 1-8.

*Primary Examiner* — John B King

(74) *Attorney, Agent, or Firm* — Rutan & Tucker, LLP; Ravi Mohan; Marc A. McClain

(57) ABSTRACT

Generative artificial intelligence models receive prompts as input. The prompts can be augmented using contextual data retrieved by a retrieval-augmented generation process. Including sensitive data in a prompt or in contextual data can compromise the security of the sensitive data by exposing proprietary information to the respective generative artificial intelligence model. The sensitive data can be secured while remaining useful as contextual data using a secure augmentation logic. The secure augmentation logic receives sensitive data related to a plurality of entities and generates a knowledge graph that encodes relationships among the entities. The secure augmentation logic consistently anonymizes one or more entities in the knowledge graph according to a sensitive data anonymization policy. The secure augmentation logic generates a set of data representations based on the consistently anonymized knowledge graph. The set of data representations can be used as a source of contextual data by a retrieval-augmented generation process.

20 Claims, 13 Drawing Sheets

(56) References Cited

U.S. PATENT DOCUMENTS

| | | | | |
|---|---|---|---|---|
| 2022/0222703 | A1 | 7/2022 | Lagi et al. | |
| 2024/0273230 | A1 | 8/2024 | Ben Gur et al. | |
| 2024/0419830 | A1* | 12/2024 | Park | G06F 16/242 |
| 2025/0086309 | A1* | 3/2025 | Harinath | G06F 21/6245 |
| 2025/0094506 | A1* | 3/2025 | Sachindran | G06F 16/345 |
| 2025/0095642 | A1* | 3/2025 | Ghose | G06N 7/01 |
| 2025/0111192 | A1* | 4/2025 | Bayless | G06F 16/3329 |
| 2025/0156300 | A1* | 5/2025 | Peng | G06N 20/00 |
| 2025/0165648 | A1* | 5/2025 | Gomez | G06F 21/6254 |
| 2025/0225277 | A1* | 7/2025 | Morris | G06F 21/6254 |
| 2025/0259041 | A1* | 8/2025 | Crabtree | G06N 3/047 |
| 2025/0259711 | A1* | 8/2025 | Crabtree | G16B 50/00 |
| 2026/0044596 | A1* | 2/2026 | Bakshi | G06F 21/552 |
| 2026/0044622 | A1* | 2/2026 | Chowdhary | G06F 21/6227 |

* cited by examiner

CONSISTENTLY ANONYMIZED SENSITIVE DATA KNOWLEDGE GRAPH FOR RETRIEVAL AUGMENTED GENERATION

The present disclosure relates to securing sensitive data. More particularly, the present disclosure relates to securing sensitive data for use with artificial intelligence models.

BACKGROUND

Artificial intelligence (AI) models are rapidly being integrated into various enterprise-level use cases by myriad organizations, such as businesses that provide customer support for their products. Many AI models, such as large language models (LLMs), are trained in part by data submitted to the models by users in the course of using the models. However, various enterprise-level use cases where an enterprise user would benefit from providing data to a model are currently infeasible due to the sensitive nature of the involved data. This sensitive nature precludes the user from employing the AI model for those use cases, to avoid the potential public exposure of the sensitive data via the AI model. Currently, once information is learned by an AI model, there is no established method to selectively unlearn that specific information from the AI model without significant retraining.

Some existing technologies pertaining to the use of sensitive data with AI models involve anonymizing or otherwise securing the output of the AI model. This does not prevent the model from becoming aware of the sensitive data it takes as input. As such, the AI model can train on that sensitive data, and the risk of sensitive information subsequently being exposed by the AI model remains. Other existing technologies leverage a database that stores sensitive data. As needed, these technologies replace sensitive data with dummy data as input to the AI model. The output of the AI model is then updated to replace dummy data with sensitive data according to applicable access permissions. These technologies may secure generic personally identifiable information (PII), but they fail to secure all proprietary information of the party feeding data into the AI model, and also fail to preserve the integrity of relationships among entities in the sensitive data when replacing the sensitive data with dummy data. As such, these technologies still pose the risk of exposing sensitive data, and potentially cause less accurate output by obfuscating aspects of the data input to the AI model, such as the relationships among entities in the sensitive data.

Some AI models are used in conjunction with a retrieval-augmented generation (RAG) service that improves responses provided by the AI models. RAG services retrieve relevant information from external knowledge bases that is used to augment the prompt given to the AI model. For example, the retrieved relevant information may be appended to the prompt input to the AI model, leading to the AI model producing a more accurate response. If sensitive data is present in an external knowledge base used by an AI model, the various problems described above relating to sensitive data can occur, e.g., when that sensitive data is input to the AI model as relevant information retrieved by the RAG service for a prompt.

SUMMARY OF THE DISCLOSURE

Systems and methods for securing sensitive data for use with artificial intelligence models in accordance with embodiments of the disclosure are described herein.

According to some embodiments, a device comprises a processor and a memory communicatively coupled to the processor. The memory comprises a secure augmentation logic that is configured to receive sensitive data related to a plurality of entities. The secure augmentation logic is further configured to generate a knowledge graph based on the sensitive data, wherein the knowledge graph encodes relationships among the plurality of entities. The secure augmentation logic is further configured to consistently anonymize one or more entities of the plurality of entities in the knowledge graph according to a sensitive data anonymization policy, resulting in a consistently anonymized knowledge graph. The secure augmentation policy is further configured to generate a set of data representations based on the consistently anonymized knowledge graph. The secure augmentation policy is further configured to store the set of data representations in a context data store. When a query parameter of a user query to a generative artificial intelligence system is applied to the context data store, contextual data is retrieved. The contextual data comprises one or more data representations of the set of data representations. The user query is augmented based on the contextual data.

According to some embodiments, the sensitive data is received from a plurality of sources, and the secure augmentation logic is further configured to consolidate the sensitive data into a single set of sensitive data and identify a relevant subset of sensitive data of the single set of sensitive data that corresponds to a particular domain, wherein generating the knowledge graph is based on the relevant subset of sensitive data to the exclusion of sensitive data not in the relevant subset.

According to some embodiments, identifying the relevant subset of sensitive data comprises filtering the single set of sensitive data to exclude from the relevant subset of sensitive data a second subset of sensitive data that scores below a threshold score corresponding to a particular attribute of the sensitive data.

According to some embodiments, the sensitive data is received from a plurality of sources, and one source of the plurality of sources comprises a customer service database.

According to some embodiments, consistently anonymizing each entity of the one or more entities comprises using a same masked value to mask the entity at each representation of the entity in the knowledge graph, and each entity of the one or more entities corresponds to a different masked value.

According to some embodiments, the context data store is a vector database, and the set of data representations comprises a set of vector embeddings.

According to some embodiments, the query parameter comprises a set of text data.

According to some embodiments, the generative artificial intelligence system comprises a large language model that produces a query response when the user query and the contextual data are applied.

According to some embodiments, the secure augmentation logic is further configured to validate the consistently anonymized knowledge graph, the validating comprising a data quality check and a data security check. Furthermore, generating the set of data representations is responsive to the validating.

According to some embodiments, a method of consistently anonymized retrieval augmented generation comprises receiving sensitive data related to a plurality of entities. The method further comprises generating a knowledge graph based on the sensitive data, wherein the knowledge graph encodes relationships among the plurality of entities. The method further comprises consistently anonymizing one or more entities of the plurality of entities in the knowledge graph according to a sensitive data anonymization policy, resulting in a consistently anonymized knowledge graph. The method further comprises generating a set of data representations based on the consistently anonymized knowledge graph. The method further comprises storing the set of data representations in a context data store. When a query parameter of a user query to a generative artificial intelligence system is applied to the context data store, contextual data is retrieved. The contextual data comprises one or more data representations of the set of data representations. The user query is augmented based on the contextual data.

According to some embodiments, a non-transitory computer-readable memory storing computer program instructions executable by a processor to perform operations that, when executed by the processor, cause the processor to receive a query parameter corresponding to a user query to a generative artificial intelligence service. The operations further include retrieving contextual data from a context data store based on the query parameter. The retrieved contextual data comprises one or more data representations of a set of data representations stored by the context data store. The set of data representations are generated based on a consistently anonymized knowledge graph that encodes relationships among a plurality of entities within a set of sensitive data. One or more entities of the plurality of entities represented in the consistently anonymized knowledge graph is consistently anonymized according to a sensitive data anonymization policy. The operations further comprise sending the contextual data to the generative artificial intelligence service as an augmentation to the user query.

Other objects, advantages, novel features, and further scope of applicability of the present disclosure will be set forth in part in the detailed description to follow, and in part will become apparent to those skilled in the art upon examination of the following or may be learned by practice of the disclosure. Although the description contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
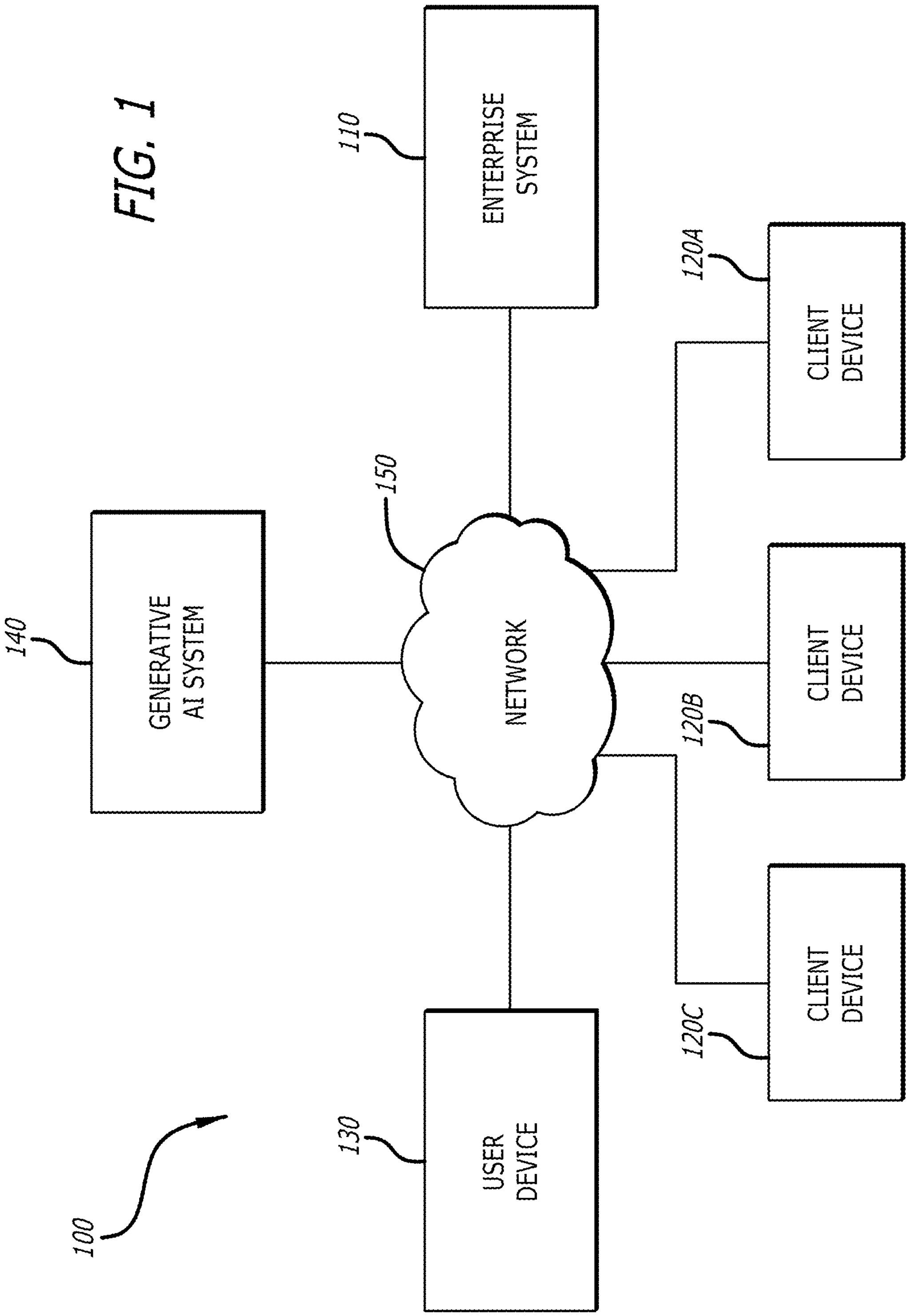
FIG. 1 illustrates an example computing environment for securing sensitive data for use with artificial intelligence models in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein to facilitate securing sensitive data for use with artificial intelligence (AI) models. Using the devices and techniques described herein, a user or an organization, such as an enterprise, can collect sensitive data, such as proprietary customer information relating to past customer service tickets. The organization can use the devices and techniques described herein to construct a knowledge graph using the collected sensitive data, apply a sensitive data anonymization policy to the knowledge graph, and turn the knowledge graph into a set of data representations, such as vector embeddings. The organization can employ the set of data representations in a retrieval-augmented generation (RAG) process to improve the performance of an AI model in responding to a query. In this manner, sensitive data is not ingested by the AI model, but the set of data representations based on the sensitive data retain entity relationship information that can augment the AI model's generation of a response to a prompt.

As a particular example, a software company may provide customer service to its customers, such as technical support.

Technical support cases may be tracked through service tickets, and detailed information relating to each technical support case may be stored in a database of resolved service tickets and related data. However, the data in this database contains sensitive data of the customers, which can include personally identifiable information (PII) and/or proprietary customer data, such as data relating to a particular customer's network topography. Data related to technical support may be found elsewhere within the software company's computing environment as well, such as in emails, note applications, spreadsheets, marketing case studies, and expert opinion documents. A secure augmentation logic, which can include any combination of devices and/or techniques described herein, may collect all this relevant data and apply it to a knowledge graph generation application to generate a knowledge graph containing nodes representing entities, such as customers, data centers, and internet protocol (IP) addresses, connected by edges representing relationships, such as "hosted on" (for a customer and a data center), or "connected on" (for a customer and an IP address). This consolidated data source provides deep insights into the sensitive data that can be useful in generating responses to prompts relating to the sensitive data.

To secure the sensitive data represented in the knowledge graph, without compromising the relationship information that may be used to augment a prompt to an AI model, such as a large language model (LLM), the secure augmentation logic may apply a sensitive data anonymization policy to the knowledge graph. The sensitive data anonymization policy consistently anonymizes each entity in the knowledge graph according to a rule for that entity type. For example, each node in the knowledge graph pertaining to a particular customer is masked with the same character string. A different customer would be masked with a different character string, and so on. In this manner, the relationship information encoded in the knowledge graph, such as the number of customers hosted on a particular data center, is not compromised by the security action of applying the sensitive data anonymization policy.

The secure augmentation logic uses a data representation application, such as a vector embedding model, to produce a set of data representations, such as a set of vector embeddings, based on the consistently anonymized knowledge graph. The software company stores the set of vector embeddings in a context data store, which can be accessed by a RAG process to obtain data representations relevant to a particular prompt. The relevant data representations can be used to augment the prompt, improving the results generated by the AI model without compromising the security of the sensitive data.

In addition to the advantages and benefits described above, these devices and techniques can satisfy compliance with data privacy regulations, such as the General Data Protection Regulation (GDPR), California Consumer Privacy Act (CCPA), and Health Insurance Portability and Accountability Act (HIPAA). These devices and techniques can also improve customer experience by improving the results of AI models used in responding to customer service matters, reducing the time needed to resolve issues. Also, by consolidating sensitive data related to a particular topic, such as customer service, these devices and techniques provide for a single source of truth for relevant information, enabling better collaboration, decision-making, and data-driven insights, eliminating redundant efforts, and providing for consistent relevant information across teams at an organization. Furthermore, by effectively removing proprietary information without compromising accuracy, the devices and techniques described herein allow for the use of not only privately hosted AI models, but also public AI models.

Although often described herein with respect to an example use case of data related to customer service and technical support, this is for purposes of clarity and conciseness of description. A person of skill in the art will recognize that the devices and techniques described herein can be applied to data related to any subject without departing from the principles set forth herein. For example, in various embodiments, the devices and techniques described herein may be employed by a credit card issuer to augment an AI model's ability to respond to prompts regarding credit card user's spending habits. As another example, in various embodiments, the devices and techniques described herein may be employed by a healthcare provider to augment an AI model's ability to respond to prompts regarding patient care.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data. Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, an example computing environment 100 for securing sensitive data for use with artificial intelligence models in accordance with various embodiments of the disclosure is shown. The computing environment 100 implements a secure augmentation logic in accordance with various embodiments of the disclosure. Depending upon the embodiment, the secure augmentation logic may include hardware and/or software, and can be configured in a variety of ways. In some non-limiting examples, the secure augmentation logic can be configured as a standalone device, exist as a logic within a device, be distributed among various devices on a network operating in tandem, or remotely operated as part of a cloud-based system. For example, some or all functionality described below may be performed by the secure augmentation logic, and the secure augmentation logic may comprise some or all of one or more hardware and/or software components of the computing environment 100.

The computing environment 100 includes an enterprise system 110, a plurality of client devices 120A, 120B, 120C (collectively referred to as "the client devices 120"), a user device 130 and a generative AI system 140 connected on a network 150. Depending upon the embodiment, the computing environment 100 may include fewer, other, or additional elements than those described herein. For example, in various embodiments, the computing environment 100 may include multiple user devices 130 and/or more or fewer client devices 120. As other non-limiting examples, some or all of the generative AI system 140 may be implemented at the enterprise system 110 and/or user device 130.

The enterprise system 110 is one or more computing devices capable of transmitting and/or receiving data via the network 150. Depending upon the embodiment, the enterprise system 110 can include a conventional computer system, such as a desktop or laptop computer; a mobile computer system, such as a smartphone, tablet, or personal digital assistant; a server, such as an organization's data center, or an organization's tenant space on a cloud environment; another suitable device; or any combination thereof. In various embodiments, the enterprise system 110 is associated with an organization. For example, the enterprise system 110 may include the private computing environment of a company, e.g., a company associated with a client device 120. In various embodiments, the enterprise system 110 receives sensitive data from one or more client devices 120 and stores some or all of the received sensitive data, e.g., at a local data store.

The client devices 120 are computing devices capable of transmitting and/or receiving data via the network 150. Depending upon the embodiment, client devices 120 can include conventional computer systems, such as desktop or laptop computers; mobile computer systems, such as smartphones, tablets, or personal digital assistants; servers, such as an organization's data center, or an organization's tenant space on a cloud environment; other suitable devices; or any combination thereof. In various embodiments, different client devices 120 correspond to different organizations. For example, client device 120A may correspond to a "Customer A" of an organization associated with the enterprise system 110, client device 120B may correspond to a "Customer B" of the organization, and client device 120C may correspond to a "Customer C" of the organization. In various embodiments, one or more client devices 120 transmit sensitive data to the enterprise system 110, user device 130, and/or generative AI system 140. For example, client device 120A may submit a technical support request to the enterprise system 110. The enterprise system 110 may generate a service ticket based on the technical support request, and receive sensitive data related to the technical support request from the client device 120A.

The user device 130 is one or more computing devices capable of transmitting and/or receiving data via the network 150. Depending upon the embodiment, the user device 130 can include a conventional computer system, such as a desktop or laptop computer; a mobile computer system, such as a smartphone, tablet, or personal digital assistant; a server, such as an organization's data center, or an organization's tenant space on a cloud environment; another suitable device; or any combination thereof. In various embodiments, the user device 130 is part of the enterprise system 110, such as the end user device of an employee of a company associated with the enterprise system 110. In various embodiments, a user may use the user device 130 to submit queries to the generative AI system 140, receive queries from the generative AI system 140, communicate with client devices 120, and/or interact with the enterprise system 110. In some embodiments, via the user device 130, a user implements and/or configures the secure augmentation logic, e.g., functionality hosted by the generative AI system 140 and/or enterprise system 110, or in some embodiments, functionality local to the user device 130.

The generative AI system 140 exposes generative artificial intelligence functionality, as described in further detail below with respect to FIG. 2. In some embodiments, the generative AI system 140 is connected to the network 150, as in the example of FIG. 1. In other embodiments, the generative AI system 140 is not connected to the network 150, and is instead local to a device or a local area network, such as an organization's private computing environment.

The network 150 can include wired networks and/or wireless networks. In a variety of embodiments, the network 150 may include remote networks, such as, but not limited to a deployed network. The network 150 may be implemented as a local area network (LAN), wide area network (WAN), global distributed network such as the Internet, an intranet, an extranet, or any other form of wireless or wireline communication network. In some embodiments, the network 150 uses standard communications technologies and/or protocols. For example, the network 150 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
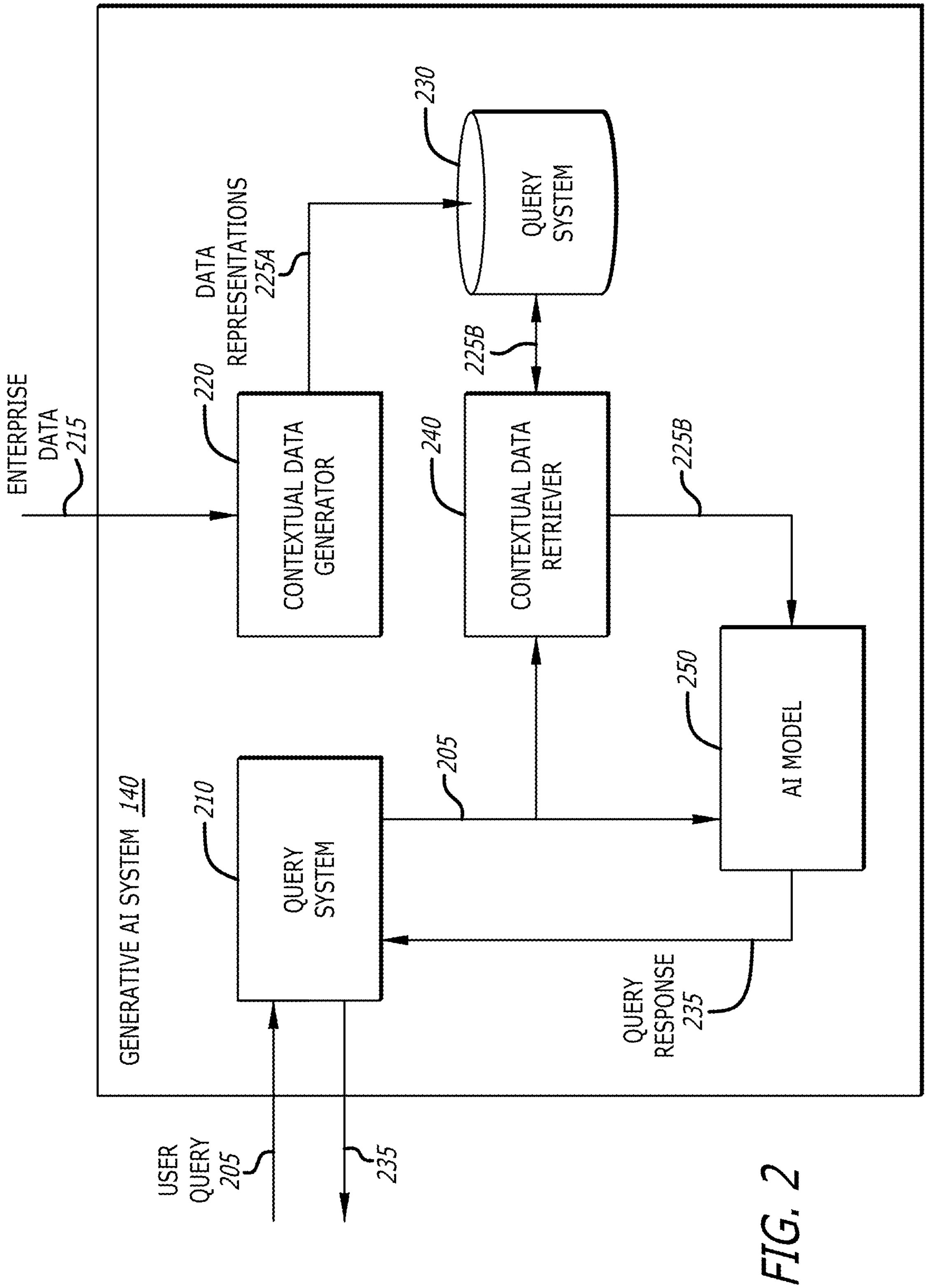
FIG. 2 is a data flow diagram of a generative artificial intelligence system that secures sensitive data in accordance with various embodiments of the disclosure.

Referring to FIG. 2, a data flow diagram of a generative artificial intelligence (AI) system that secures sensitive data in accordance with various embodiments of the disclosure is shown. The generative AI system 140 includes a query system 210, a contextual data generator 220, a context data store 230, a contextual data retriever 240, and an AI model 250. As described above, some or all elements of the generative AI system 140 may be part of the enterprise system 110 and/or user device 130, depending upon the embodiment. For example, the contextual data generator 220 may be part of the enterprise system 110.

The query system 210 receives queries from users, interacts with the AI model 250 and/or contextual data retriever

240, and sends query responses to users. The query system 210 includes logic to coordinate the generation of query responses based on user queries and logic to communicate via the network 150, e.g., to communicate with user device 130. For example, the query system 210 may receive a user query 205 from user device 130. In some embodiments, the query system 210 applies the user query 205 to the AI model 250, resulting in a query response 235. The query system 210 receives the query response 235 from the AI model and sends it to the user device 130. In various embodiments, the query system 210 sends the query to the contextual data retriever 240, which fetches contextual data 225B used to augment the user query 205. The query system 210 and/or contextual data retriever 240 apply the user query 205 and contextual data 225B to the AI model 250. For example, the query system 210 may apply the user query 205 to the AI model 250 and the contextual data retriever 240 applies the contextual data 225B to the AI model 250. Alternatively, the contextual data retriever 240 applies both the user query 205 and the contextual data 225B to the AI model 250. In some embodiments, the query system 210 comprises a query server.

The contextual data generator 220 generates data representations 225A based on enterprise data 215 and stores the generated data representations 225A in the context data store 230. As described in greater deal below with reference to FIG. 8, the contextual data generator 220 receives enterprise data 215 from one or more sources at the enterprise system 110. The enterprise data 215 includes sensitive data, such as proprietary data of a customer, and/or personally identifiable information (PII). The contextual data generator 220 may perform one or more preprocessing actions such as filtering the enterprise data 215, then generates a knowledge graph based on the enterprise data 215. The contextual data generator 220 applies a sensitive data anonymization policy to the knowledge graph, resulting in a consistently anonymized knowledge graph. The contextual data generator 220 converts the consistently anonymized knowledge graph into a set of data representations. For example, the contextual data generator 220 may apply the consistently anonymized knowledge graph to an embedding model to produce a set of vector embeddings. The contextual data generator 220 stores the set of data representations in the context data store 230.

The sensitive data anonymization policy is a set of rules and/or heuristics for masking sensitive data in a knowledge graph. The sensitive data anonymization policy may be created by the enterprise system 110, e.g., by a user of a user device 130 that is part of the enterprise system 110. In various embodiments, the sensitive data anonymization policy includes a respective masking rule for one or more entity types. For example, a first masking rule may be for a "datacenter" entity type, where a node in a knowledge graph of entity type "datacenter" is masked with a masking value comprising four lowercase letters. A second masking rule may be for a "customer" entity type, where a node in a knowledge graph of entity type "customer" is masked with a masking value comprising four uppercase letters. A third masking rule may be for an "IP address" entity type, where a node in a knowledge graph of entity type "IP address" is masked with a masking value comprising two digits, then a period, then two digits, then a period, then two digits, then a period, then two digits. A fourth masking rule may be for a "service ticket" entity type, where a node in a knowledge graph of entity type "service ticket" is masked with an eight character alphanumeric string.

In various embodiments, the sensitive data anonymization policy includes one or more rules for traversing a knowledge graph and one or more rules for consistently anonymizing the knowledge graph. The one or more rules for consistently anonymizing the knowledge graph can include a rule to check whether the entity of a current node has already been masked, and if so, to use the same masking value as before to mask the current node. The one or more rules for consistently anonymizing the knowledge graph can also include a rule to generate a new masking value for the current node if the entity of the current node has not previously been masked, and to generate the new masking value for the current node according to a rule of the sensitive data anonymization policy corresponding to the entity type of the entity of the current node.

The context data store 230 is a non-transitory data storage that stores at least data representations 225A. The context data store 230 may be any type of data store, such as a vector database, non-relational database, or relational database. In various embodiments, the context data store 230 is part of the enterprise system 110 or user device 130. In other embodiments, the context data store 230 is hosted by a cloud platform, e.g., a cloud platform associated with the enterprise system 110 and/or AI model 250.

The contextual data retriever 240 retrieves contextual data, including one or more relevant data representations, from the context data store 230 based on a user query 205. In various embodiments, the contextual data retriever 240 transforms the user query 205 to generate a query representation for searching the context data store 230. For example, the contextual data retriever 240 may apply the user query 205 to an embedding model to create a query representation comprising a vector embedding, and then may use the query representation to identify and retrieve similar vector embeddings in the context data store 230. The contextual data retriever 240 applies the retrieved contextual data 225B to the AI model 250. Operations related to the contextual data retriever 240 are described in further detail below with reference to FIG. 9.

In various embodiments, the contextual data retriever 240 is the retriever component of a retrieval-augmented generation (RAG) process. RAG is a process that enhances the output of a large language model by integrating relevant external information retrieved from a structured or unstructured knowledge base. In this process, a user's input query is first analyzed to generate a retrieval request, which is then used by the retriever component to search a database or document store for the most contextually relevant documents or passages. These retrieved documents are then combined with the original input query to form an augmented input, which is subsequently processed by a the large language model. The large language model utilizes both the input query and the augmented contextual information to generate a more accurate and context-aware response. This approach improves the relevance and factual accuracy of the generated content by grounding it in the retrieved knowledge.

The AI model 250 receives the user query 205 and the contextual data 225B. The AI model 250 generates a response based on the user query 205 and contextual data 225B. The AI model 250 sends the response to the query system 210. The AI model 250 can be any of a variety of artificial intelligence models capable of generating output based on input, including any the various models described below. In various embodiments, the AI model 250 is a large language model. A large language model is an artificial intelligence system designed to process and generate human language by leveraging deep neural network architectures, typically based on transformer models. These models are trained on vast datasets containing text from diverse sources, enabling them to learn complex linguistic patterns, contextual relationships, and semantic meanings. Through this training, the model develops the capability to generate coherent and contextually relevant text, perform language translation, answer questions, and engage in dialogue. The model operates by encoding input text into high-dimensional representations, which are then processed through multiple layers of attention mechanisms to capture intricate dependencies between words. By decoding these representations, the model generates output text that is contextually consistent with the input.

Figure 3B:
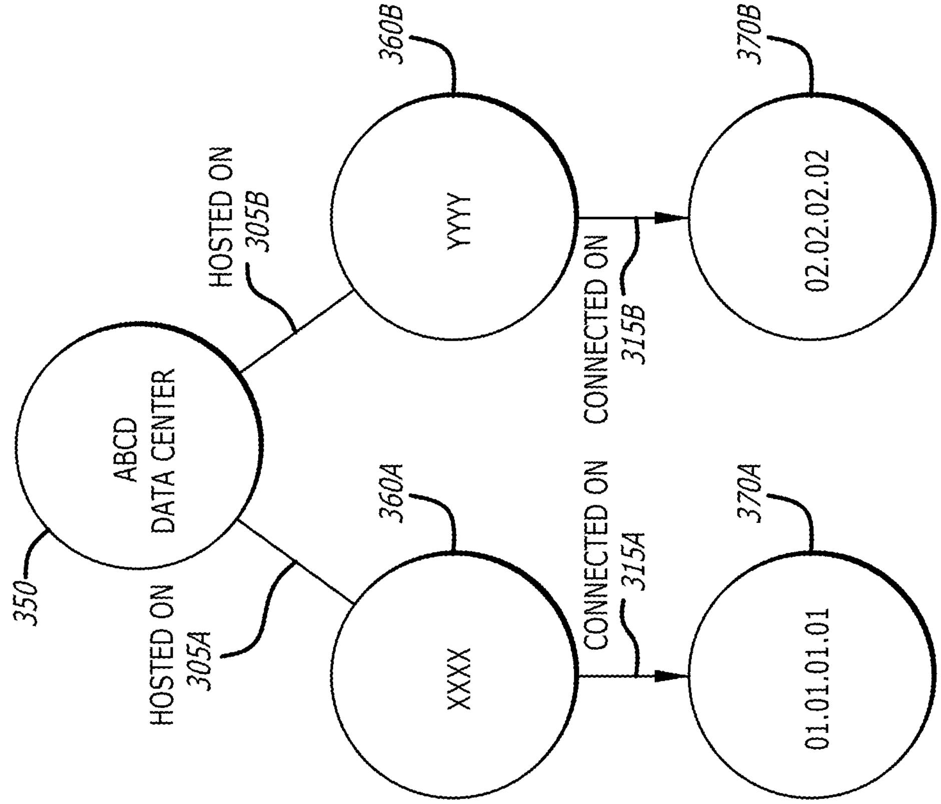
FIG. 3B illustrates a first example of a consistently anonymized knowledge graph in accordance with various embodiments of the disclosure.
Figure 3A:
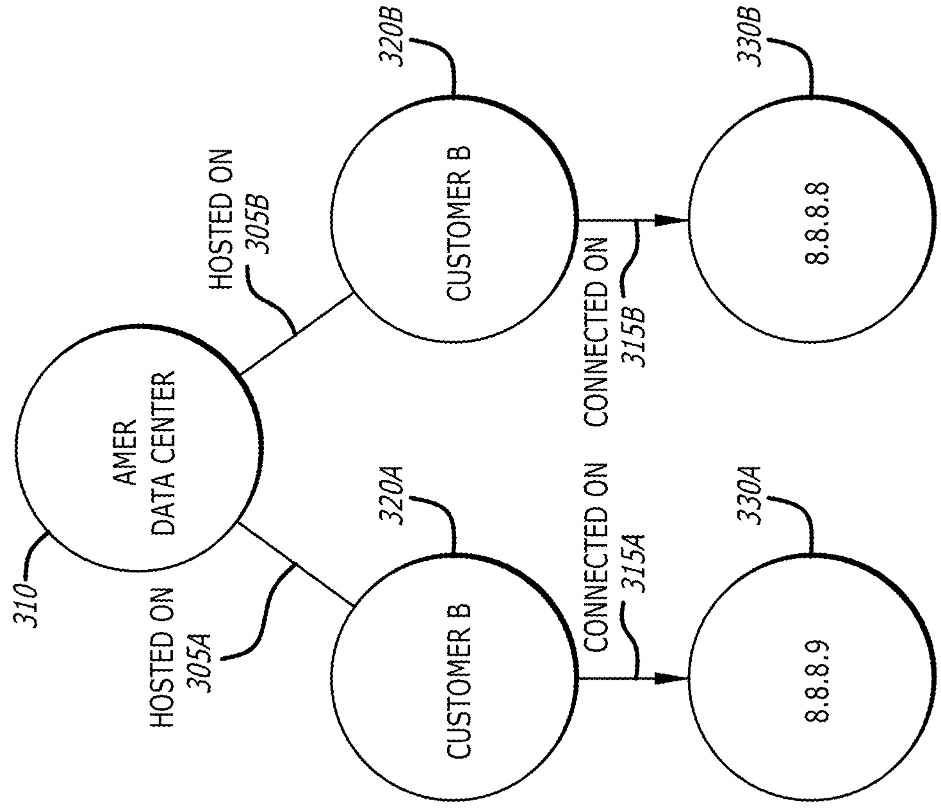
FIG. 3A illustrates a first example of a knowledge graph in accordance with various embodiments of the disclosure.

Referring to FIG. 3A, an illustration of a first example of a knowledge graph in accordance with various embodiments of the disclosure is shown. The knowledge graph in FIG. 3A may be constructed based on sensitive data according to the techniques described above. In practice, knowledge graphs constructed according to the techniques described above are typically much larger in terms of the quantity of nodes and edges that comprise the knowledge graph. However, for purposes of clarity of description, the example of FIG. 3A includes five nodes, e.g., 310A, 320A-B, 330A-B, and four edges, e.g., 305A-B, 315A-B. Although not illustrated, again for purposes of clarity, knowledge graphs such as the example in FIG. 3A can include one or more data properties, e.g., literal attributes, for one or more entities. As a specific example, a node in a knowledge graph can have a relational attribute, represented by an edge connecting the node to another node, and also a literal attribute, such as an "age" attribute attached directly to an "Alice" entity representing a person. In various embodiments, the names associated with nodes, such as those described below, can correspond to literal attributes associated with the respective nodes in the knowledge graph. For example, node 320A, representing "Customer A," can have a literal attribute of "name" with value "Customer A."

The knowledge graph of FIG. 3A includes five nodes of three entity types and four edges of two relationship types. Node 310 is a datacenter entity type, representing an "AMER datacenter." Nodes 320A-B are a customer entity type. Node 320A represents "Customer A" and node 320B represents "Customer B." Nodes 330A-B are an IP address entity type. Node 330A represents "8.8.8.9" and node 330B represents "8.8.8.8." Edges 305A-B are a "hosted on" relationship type. Edge 305A connects node 320A to node 310. Edge 305B connects node 320B to node 310. These edges 305A-B, for example, may represent that Customer A and Customer B are hosted on AMER datacenter. Edges 315A-B are illustrated in a "connected on" relationship type. Edge 315A connects node 330A to node 320A. Edge 315B connects node 330B to node 320B. It should be appreciated that in many embodiments, the edges 315A-B represent that Customer A is connected on IP address 8.8.8.9 and Customer B is connected on IP address 8.8.8.8.

The knowledge graph of FIG. 3A contains sensitive data that an organization may not wish to feed to an AI model, or may not be allowed to feed to an AI model (or otherwise share outside the organization). For example, proprietary customer data such as which datacenter a customer is hosted on and which IP address the customer is connected on, as captured by the knowledge graph. As such, the organization may employ secure augmentation logic to consistently anonymize the knowledge graph, retaining informative relationship information while securing the proprietary customer data.

Referring to FIG. 3B, an illustration of a first example of a consistently anonymized knowledge graph in accordance with various embodiments of the disclosure is shown. The consistently anonymized knowledge graph is similar to that of FIG. 3A, but after the application of a sensitive data anonymization policy as described above. The consistently anonymized knowledge graph includes five nodes of three entity types and four edges of two relationship types. Node 350 is a datacenter entity type, representing an "abcd datacenter." Nodes 360A-B are a customer entity type. Node 360A represents "XXXX" and node 360B represents "YYYY." Nodes 370A-B are an IP address entity type. Node 370A represents "01.01.01.01" and node 370B represents "02.02.02.02." Edges 305A-B are a "hosted on" relationship type. Edge 305A connects node 360A to node 350. Edge 305B connects node 360B to node 350. These edges 305A-B represent that XXXX and YYYY are hosted on abcd datacenter. Edges 315A-B are a "connected on" relationship type. Edge 315A connects node 370A to node 360A. Edge 315B connects node 370B to node 360B. These edges 315A-B represent that XXXX is connected on IP address 01.01.01.01 and YYYY is connected on IP address 02.02.02.02.

In this manner, the consistently anonymized knowledge graph illustrates masking values applied according to the sensitive data anonymization policy to mask sensitive data in the knowledge graph of FIG. 3A. The AMER datacenter corresponding to node 310 of FIG. 3A is masked in FIG. 3B at node 350 as the abcd datacenter. Customer A, corresponding to node 320A of FIG. 3A, is masked in FIG. 3B at node 360A as XXXX. Customer B, corresponding to node 320B of FIG. 3A, is masked in FIG. 3B at node 360B as YYYY. IP address 8.8.8.9, corresponding to node 330A of FIG. 3A, is masked in FIG. 3B at node 370A as 01.01.01.01. IP address 8.8.8.8, corresponding to node 330B of FIG. 3A, is masked in FIG. 3B at node 370B as 02.02.02.02. The relationships among the entities in the knowledge graph, e.g., the "hosted on" relationships at edges 305A-B and the "connected on" relationships at edges 315A-B, are not affected by the application of the sensitive data anonymization policy. Furthermore, the entity types of the nodes are preserved, such as Customer A being masked with a character string XXXX, and IP address 8.8.8.9 being masked with 01.01.01.01. As such, the knowledge graph retains information that is useful for augmenting a prompt to an AI model when the prompt relates to the knowledge represented in the knowledge graph.

Figure 3D:
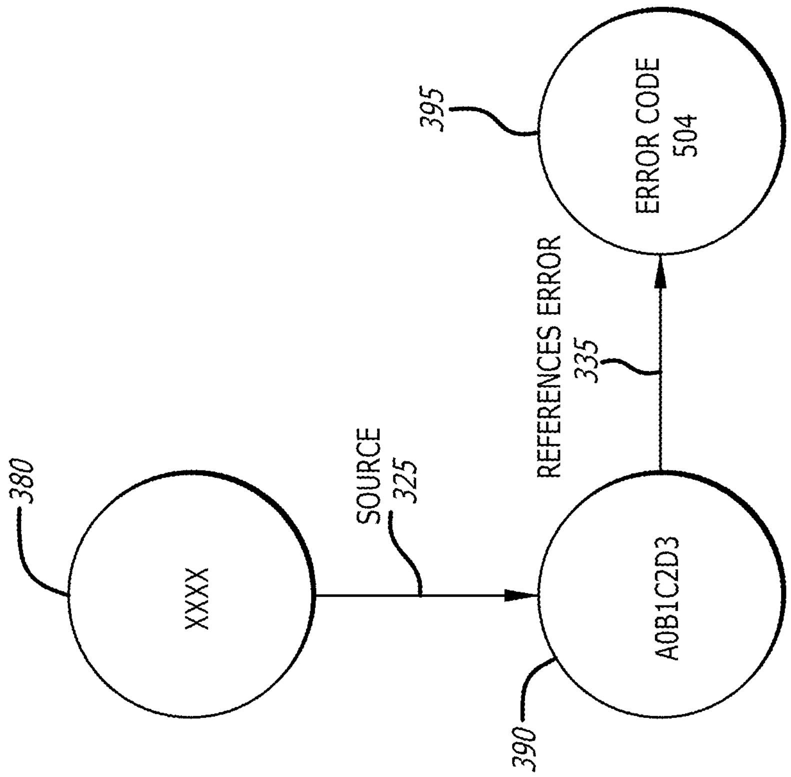
FIG. 3D illustrates a second example of a consistently anonymized knowledge graph in accordance with various embodiments of the disclosure.
Figure 3C:
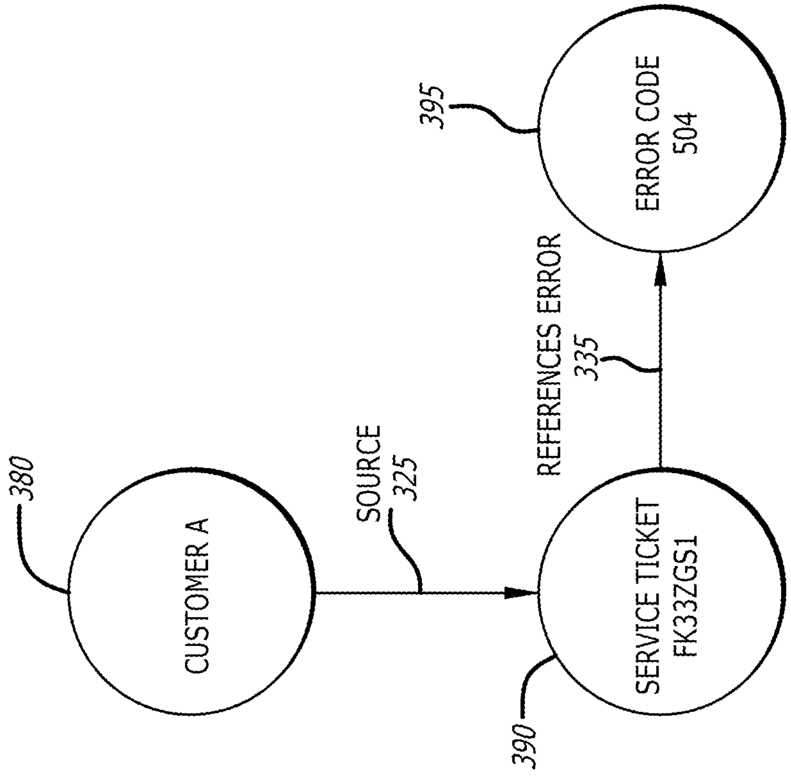
FIG. 3C illustrates a second example of a knowledge graph in accordance with various embodiments of the disclosure.

Referring to FIG. 3C, an illustration of a second example of a knowledge graph in accordance with various embodiments of the disclosure is shown. The knowledge graph in FIG. 3C may be constructed based on sensitive data according to the techniques described above, similar to the knowledge graph of FIG. 3A. Depending upon the embodiment, the knowledge graph of FIG. 3A and the knowledge graph of FIG. 3C may be different portions of a single larger knowledge graph. For example, Customer A represented at node 380 of FIG. 3C may correspond to Customer A represented at node 320A of FIG. 3A. In some embodiments, node 380 of FIG. 3C may be node 320A of FIG. 3A.

The knowledge graph of FIG. 3C includes three nodes of three entity types and two edges of two relationship types. Node 380 is a customer entity type, representing "Customer A." Node 390 is a service ticket entity type, representing service ticket "Fk33zGs1." Node 395 is an error code entity type, representing error code "504." Edge 325 is a "source" relationship type and connects node 380 to node 390, representing service ticket Fk33zGs1 originated from Customer A. Edge 335 is a "references error" relationship type and connects node 390 to node 395, representing that service ticket Fk33zGs1 references error code "504."

The knowledge graph of FIG. 3C contains sensitive data that an organization may not wish to feed to an AI model, or may not be allowed to feed to an AI model (or otherwise share outside the organization). For example, proprietary customer data such as service tickets relating to the customer and which errors the customer encountered, as captured by the knowledge graph. As such, the organization may employ secure augmentation logic to consistently anonymize the knowledge graph, retaining informative relationship information while securing the proprietary customer data.

Referring to FIG. 3D, an illustration of a second example of a consistently anonymized knowledge graph in accordance with various embodiments of the disclosure is shown. The consistently anonymized knowledge graph is similar to that of FIG. 3B, but after the application of a sensitive data anonymization policy as described above. The consistently anonymized knowledge graph includes three nodes of three entity types and two edges of two relationship types. Node 380 is a customer entity type, representing "XXXX." Node 390 is a service ticket entity type, representing service ticket "a0b1c2d3." Node 395 is an error code entity type, representing error code "504." Edge 325 is a "source" relationship type and connects node 380 to node 390, representing service ticket a0b1c2d3 originated from XXXX. Edge 335 is a "references error" relationship type and connects node 390 to node 395, representing that service ticket a0b1c2d3 references error code "504."

Depending upon the embodiment, the consistently anonymized knowledge graph of FIG. 3B and the consistently anonymized knowledge graph of FIG. 3D may be different portions of a single larger consistently anonymized knowledge graph. For example, XXXX represented at node 360A of FIG. 3B may correspond to XXXX represented at node 380 of FIG. 3D. In some embodiments, node 360A of FIG. 3B may be node 380 of FIG. 3D.

As illustrated, application of the sensitive data anonymization policy does not necessarily result in the masking of every entity in the knowledge graph. Node 395 continues to represent error code 504 in the consistently anonymized knowledge graph, even after the sensitive data anonymization policy is applied. As described above, in various embodiments the sensitive data anonymization policy masks entities according to entity type, and certain entity types may not correspond to a masking rule, such as entity types that do not reveal proprietary customer information.

The consistently anonymized knowledge graph of FIG. 3D illustrates consistent anonymization when considered in conjunction with the consistently anonymized knowledge graph of FIG. 3B. The consistently anonymized knowledge graphs of FIGS. 3B and 3D may be portions of a single larger consistently anonymized knowledge graph, but node 360A and node 380 both correspond to the masked value XXXX. When the sensitive data anonymization policy traverses a knowledge graph, at a first application of a masking rule to an entity represented by a node, a masking value is generated that is used to mask the entity at the node. At subsequent encounters with the entity in the knowledge graph at other nodes, the sensitive data anonymization policy applies the same masking value to the entity at the other nodes. In this manner, the entity is consistently anonymized in the knowledge graph, and relational knowledge corresponding to the entity at different locations in the knowledge graph can be correlated and learned from by an AI model without exposing the proprietary customer information that is masked.

As a particular example, the consistently anonymized knowledge graph of FIG. 3D illustrates that a customer was a source of a service ticket that references error code 504, but the details of the customer are masked. As such, an AI model can learn from the consistently anonymized knowledge graph regarding how a service ticket addressing error code 504 was resolved, e.g., through one or more data representations based on the knowledge graph used to augment a user query to the AI model, without the exposure of sensitive data to the AI model.

Figure 4:
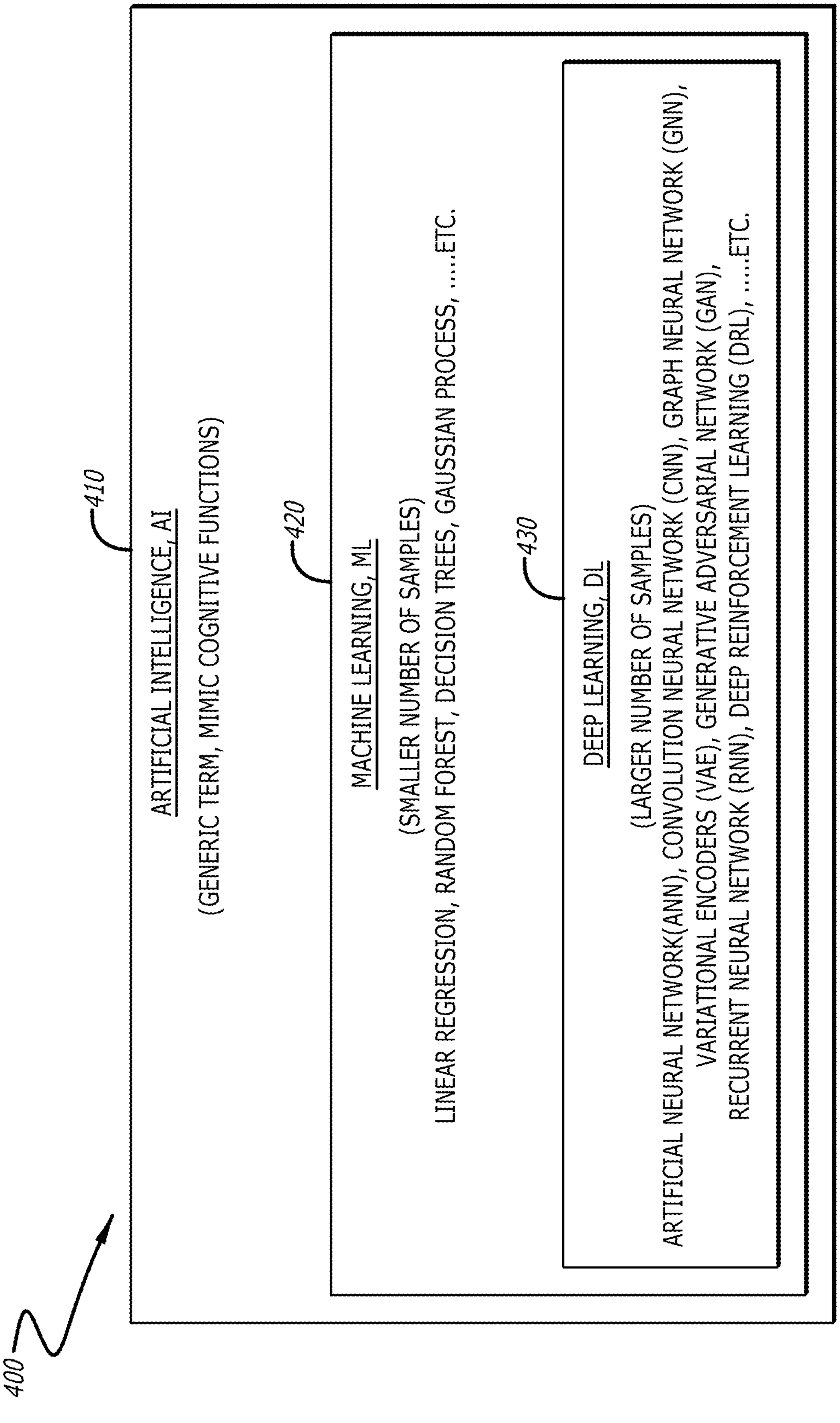
FIG. 4 is a diagram depicting various subsets of artificial intelligence in accordance with various embodiments of the disclosure.

Referring to FIG. 4, a diagram 400 depicting various subsets of artificial intelligence in accordance with various embodiments of the disclosure is shown. Artificial intelligence (AI) 410 is typically understood in the art to be the development of machines and algorithms that mimic human intelligence, for example, by optimizing actions to achieve certain goals. At its core, AI 410 often involves designing algorithms and models that mimic cognitive functions, such as learning, reasoning, problem-solving, perception, and even language understanding. Unlike traditional computer programs that follow a fixed set of instructions, AI systems have the ability to adapt, improve, and make decisions based on input data and environmental interactions.

AI 410 can be considered a generic term because it encompasses a wide range of subfields and techniques, from simple rule-based systems to advanced machine learning and deep learning models. These AI techniques are used to simulate various aspects of human cognition. For example, machine learning (ML) 420 allows computers to learn from data patterns without explicit programming for each task, while natural language processing (NLP) enables machines to understand and generate human language. Deep learning (DL) 430, a more advanced branch of AI, uses neural networks to automatically learn complex patterns from large datasets, akin to the human brain's information processing. This versatility makes AI a powerful tool across diverse applications, including image recognition, autonomous driving, voice assistants, healthcare diagnostics, and materials discovery.

A goal of AI is often to create systems that can function autonomously and intelligently in real-world scenarios. As AI 410 continues to evolve, it can increasingly mirror human-like cognition, enabling machines to not just process data but to "think" in a way that can handle uncertainty, make predictions, and even interact with their surroundings in a meaningful manner. While AI systems are far from achieving the full breadth of human intelligence, their ability to replicate specific cognitive functions makes them invaluable in tackling complex, data-driven challenges.

Machine Learning (ML) 420 is a subset of Artificial Intelligence (AI) 410 that focuses on the development of algorithms and statistical models that enable computers to learn and make decisions from data without explicit programming. In traditional programming, a computer is given a fixed set of rules to follow, but ML 420 can shift this paradigm by allowing systems to identify patterns, adapt, and improve their performance based on the data they encounter. This data-driven approach makes ML particularly valuable for tasks that are too complex or dynamic to define using straightforward rules, such as, for example, recognizing images, predicting consumer behavior, or diagnosing diseases. In various embodiments described herein, machine-learning methods may be utilized for secure augmentation of prompts.

ML models can be configured to analyze large amounts of data to identify trends and relationships that inform their predictions or classifications. The process typically involves three stages: training, validation, and testing. During training, the model learns from a dataset by adjusting its internal parameters to minimize errors between its predictions and the actual results. Techniques like linear regression, decision trees, random forests, and Gaussian processes are commonly used in ML 420. These algorithms can handle various data types, including numerical, categorical, and structured datasets like spreadsheets or grids. One of the key strengths of ML is its ability to generalize from the training data to make accurate predictions on new, unseen data. In a number of embodiments described herein, training data may be generated from enterprise data or consistently anonymized knowledge graphs.

However, traditional ML methods rely heavily on feature engineering, wherein human experts manually identify the most relevant features or patterns within the data. For example, when using ML 420 for image recognition, an expert might need to extract features like edges, textures, or color patterns before feeding them into a model. This requirement can limit the scalability of traditional ML approaches, especially when dealing with large, unstructured datasets such as images, text, or graphs. Additionally, ML algorithms may often work best when provided with relatively structured data, and they often need a reasonable number of samples (typically more than 100) to learn effectively.

Deep Learning (DL) 430 is a specialized subset of Machine Learning (ML) 420 that employs multi-layered artificial neural networks to automatically learn complex patterns and representations from large, often unstructured datasets. Inspired by the way the human brain processes information, DL 430 consists of interconnected layers of "neurons" that can adaptively change as they are exposed to more data. Unlike traditional ML methods, which require manual feature engineering to identify key data characteristics, DL models can automatically extract features directly from raw data, such as images, numerical, text, or molecular structures. This automated feature extraction allows DL 430 to handle data types and tasks that were previously difficult or impossible for ML models to tackle effectively.

DL models, including Convolutional Neural Networks (CNNs), Graph Neural Networks (GNNs), and Recurrent Neural Networks (RNNs), excel at processing various forms of data. CNNs are particularly effective for image analysis, recognizing intricate patterns in visual inputs, making them indispensable in areas like materials science for analyzing microscopic images or detecting defects in materials. GNNs, on the other hand, are designed to work with graph-based data, such as molecular structures, social networks, or atomic interactions. They can learn the dependencies and relationships within graph-like structures, which is crucial for predicting properties of complex molecules and materials. RNNs and their variants, such as Long Short-Term Memory (LSTM) networks, are suited for sequential data like time series or natural language processing, allowing for the analysis and generation of textual information or the prediction of temporal patterns in scientific research.

One of the defining characteristics of deep learning is its requirement for large datasets (typically over 500 samples for example) to effectively train neural networks. The deep, multi-layered structure of these networks enables them to capture highly complex and abstract representations of the data, but it also demands significant computational power. Techniques like Variational Autoencoders (VAEs) and Generative Adversarial Networks (GANs) add to the versatility of DL by enabling the generation of new data samples that resemble the training set, aiding in areas such as materials discovery and synthetic data creation. Deep Reinforcement Learning (DRL) combines neural networks with decision-making processes to solve problems that involve optimization and control, further expanding DL's application potential. In summary, DL's ability to automatically learn from raw, unstructured data and model intricate patterns makes it a powerful tool in AI, particularly for complex domains like image recognition, natural language processing, and materials science.

Artificial Neural networks (ANNs or sometimes just NNs) are often a foundation of a DL system. The basic unit of a neural network is typically the perceptron, which can take inputs, assigns weights to these inputs, and combines them to produce an output. The final output is then passed through an activation function (such as, for example, ReLU, sigmoid, or hyperbolic tangent) to introduce non-linearity, which enables the network to model complex patterns.

Neural networks are typically trained through a process of backpropagation, where the system's predictions are compared against the known output, and a loss function is used to measure the difference between the prediction and the actual result. The network's weights can be adjusted through a process called gradient descent, which can be configured to minimize the loss function over time. However, the training process can be prone to problems like overfitting (where the model performs well on the training data but poorly on new data). To counter this, techniques such as regularization (e.g., regularization, dropout), early stopping, and mini-batches can be utilized to prevent the network from becoming overly specialized to the training set.

CNNs are a specific type of ML neural network designed to work particularly well with spatial data, for example image data. However, CNNs can also work with non-image data, for example, one or more data representations, structured as a vector of features as input data. As those skilled in the art will recognize, CNNs typically use specialized layers known as convolutional layers, which apply filters (also known as kernels) to the input data. These filters slide over the input data, detecting patterns, which are then passed to the next layer for further processing. The advantage of CNNs is their ability to automatically learn and extract relevant features from raw data without the need for manual feature engineering. Furthermore, pooling layers (e.g., max-pooling or average pooling) are often added after convolutional layers to reduce the dimensionality of the data, helping to make the system more efficient while retaining the most important information. After several layers of convolutions and pooling, the CNN can output a prediction, such as determining a similarity of a data representation to a query representation.

Graph Neural Networks (GNNs) can be utilized to operate on graph-based data. In GNNs, information is passed between nodes through edges in a process called message passing. This allows the network to capture dependencies and relationships within the graph structure. The key feature of GNNs is their ability to aggregate information from neighboring nodes, which is required for predicting properties that depend on the current/local structure, such as applicable solution steps to address a customer service ticket based on past customer service data.

Generative models aim to learn the underlying distribution of a dataset and generate new samples that resemble the original data. Two common types of generative models are Variational Autoencoders (VAEs) and Generative Adversarial Networks (GANs). VAEs are often configured to work by encoding data into a lower-dimensional latent space and then decoding it back into its original form. This allows for the generation of new data by sampling points from the latent space.

Similarly, GANs consist of two components: a generator that creates fake/generated data and a discriminator that tries to distinguish between real and fake data. The two components are trained in a competitive process where the generator tries to "fool" the discriminator, leading to increasingly realistic generated data.

Reinforcement Learning (RL) involves an agent learning to make decisions by interacting with an environment and receiving feedback (rewards or penalties) based on its actions. Deep Reinforcement Learning (DRL) combines RL with DL techniques, allowing agents to learn from high-dimensional inputs, such as data representations.

In a communication network comprising a plurality of network devices such as gateways, registration servers, switches, routers, etc. DRL can be used in scenarios where an optimal decision needs to be made. The combination of RL and DL can allow for learning from raw data, making it a powerful tool for dynamic and real-time decision-making within the communication network.

Although a specific embodiment for a flowchart 900 depicting various subsets of artificial intelligence suitable for carrying out the various steps, processes, methods, and operations described herein is discussed with respect to FIG. 9, any of a variety of systems and/or processes may be utilized in accordance with embodiments of the disclosure.

Figure 5:
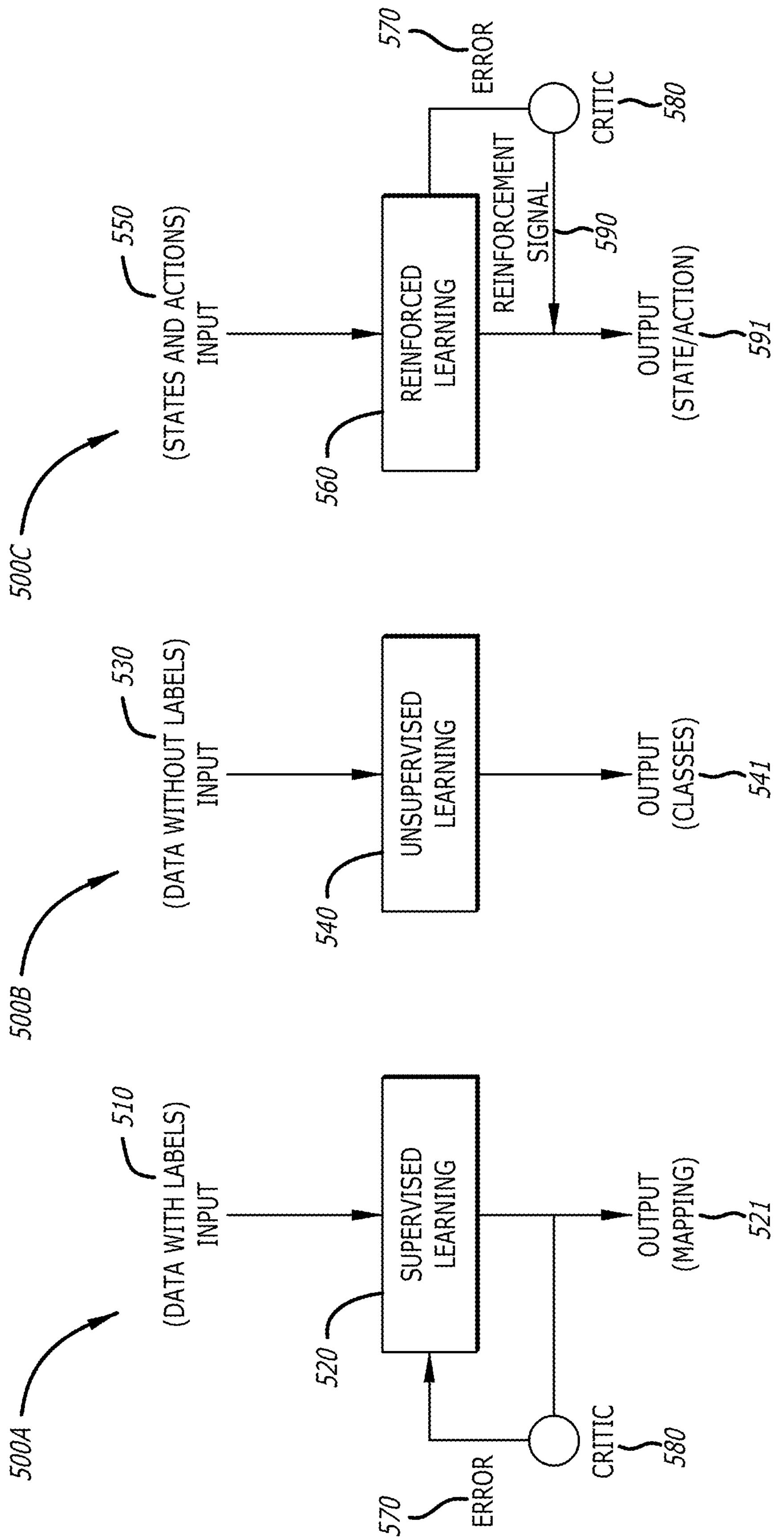
FIG. 5 is an illustration of different methods of machine-based learning in accordance with various embodiments of the disclosure.

Referring to FIG. 5, different methods of machine-based learning in accordance with various embodiments of the disclosure are shown. In many embodiments, a machine learning model is defined as a mathematical representation of the output of the training process. A machine learning model is often considered similar to computer software designed to recognize patterns or behaviors based on previous experience or data. However, the learning algorithm can discover patterns within the training data, and output an ML model which can capture these patterns and make predictions on new data.

ML models can be understood as a device that has been trained to find patterns within new data and make predictions. These models can be represented as a complex mathematical function that would be impractical for a human to calculate that takes requests in the form of input data, makes predictions on input data, and then provides an output in response. First, these models can be trained over a set of data, and then they are provided an algorithm or other task to reason over data, extract the pattern from feed data and learn from that data. Once the model(s) is/are trained, they can be used to predict a new and previously unseen dataset.

There are various types of machine learning models available based on different business goals and data sets available. Often, based on the desired application, ML models can be configured as or settle into one of three different model types: supervised learning, unsupervised learning, and/or reinforcement learning. Supervised learning can further be broken down into two categories of classification and regression. Likewise, unsupervised learning can be divided into three categories: clustering, association rule, and/or dimensionality reduction.

In the embodiment depicted in FIG. 5, a supervised learning system 500A is shown. The supervised learning system 500A can be configured with a supervised learning model 520 that accepts input data 510 and generates an output 521. However, the output data is often reviewed by a critic 580 that can determine one or more errors 570 that are fed back into the supervised learning model 520 for use in updating.

Supervised learning systems 500A are often considered the simplest machine learning model to understand in which input data (such as training data) has a known label or result as an output. So, the supervised learning model 520 can be understood to work on the principle of input-output pairs. As such, a function can be trained using a training data set, which is then applied to unknown data and makes some predictive performance. Supervised learning is task-based and mostly tested on labeled data sets.

Supervised learning systems 500A may often involve one or more regression problems. In regression problems, the output is a continuous variable. Some commonly used Regression models include linear regression, decision trees, and random forests. Linear regression is typically the most straight forward machine learning model in which a prediction of one output variable is made using one or more input variables. The representation of linear regression can be processed as a linear equation, which combines a set of input values (denoted as x) and a predicted output (denoted as y) for the set of those input values. As those skilled in the art will recognize, this may be represented in the form of a line: Y=bx+c. A typical aim of a linear regression-based model can be to find the optimal fit line that best fits the available data points. Linear regression can be extended to multiple linear regressions (finding a plane of best fit in higher dimensional space) and polynomial regressions (finding the best fit curve). Decision trees are also popular machine learning models that can be used for both regression and classification problems. A decision tree uses a tree-like structure of decisions along with their possible consequences and outcomes. In this, each internal node is used to represent a test on an attribute while each branch is used to represent the outcome of the test. The more nodes a decision tree has, the more accurate the result will be. The advantage of decision trees is that they are intuitive and easy to implement, but may lack accuracy depending on the available computational or time resources available.

Random forests are an ensemble learning method, which may consist of a large number of decision trees. For example, each decision tree in a random forest predicts an outcome, and the prediction with the majority of votes is considered as the outcome. A random forest model can be used for both regression and classification problems. For the classification task, the outcome of the random forest may be taken from the majority of votes. Whereas in the regression task, the outcome can be taken from the mean or average of the predictions generated by each tree.

Classification models are another type of supervised learning, which can be used to generate conclusions from observed values in one or more categorical forms. For example, a classification model can identify if an email is spam or not; whether a certain service ticket is valuable for learning to address customer problems, etc. Classification algorithms can also be used to predict between two or more classes and/or categorize an output into different groups. For these classification systems, a classifier model can be designed that classifies the dataset into different categories, and each category can subsequently be assigned a label. As those skilled in the art will recognize, there are currently two main types of classifications in machine learning: binary and multi-class. Binary classification can be utilized when there are only two possible classes (i.e., yes/no, dog/cat, etc.).

Multi-class classification can be utilized when there are more than two possible classes, thus requiring a multi-class classifier.

One of the potential classification processes is logistic regression. Logistic regression can be used to solve various classification problems in machine learning systems. These processes are similar to linear regression but are often used to predict categorical variables. While some variations can be configured to generate a prediction as an output in either "yes" or "no", 0 or 1, "true" or "false", etc. However, in some embodiments, the system can instead be configured to not give exact values, but instead provide probabilistic values between zero and one, etc.

Another classification process that can be utilized is a support vector machine (SVM) which is widely used for classification and regression tasks. However, the main aim of SVM is to find the best decision boundaries in an N-dimensional space, which can be utilized to segregate data points into classes, and generate a best decision boundary often known as a hyperplane. SVM processes can select the extreme vector to find a hyperplane, wherein these vectors are known as support vectors.

Naïve Bayes is another popular classification algorithm used in machine learning. This process receives its name as it is based on Bayes theorem and follows the naïve (independent) assumption between the features which is often given as the formula:

$$P(y \mid X) = \frac{P(X \mid y) * P(y)}{P(X)}$$

This formula takes a class or target y and a predictor attribute (X) and calculates a posterior probability P(y|X) of that class given a particular predictor. P(y) is the prior probability of that class, P(X) is the prior probability of the predictor, and P(X|y) is the likelihood or probability of the predictor given the class. As those skilled in the art will recognize, this may be more succinctly understood as the posterior chance being a result of the prior results times the likelihood divided by the evidence available. Each naïve Bayes classifier assumes that the value of a specific variable is independent of any other variable/feature. For example, if a fruit needs to be classified based on color, shape, and taste. So yellow, oval, and sweet will be recognized as mango. Here each feature is independent of other features.

Again, in the embodiment depicted in FIG. 5, an unsupervised learning system 500B is shown. The unsupervised learning system 500B can be configured with an unsupervised learning model 540 that accepts input data 530 and generates an output 541. Unlike other model types, there are no critics or error signals to process. Unsupervised learning models 540 can implement the learning process opposite to supervised learning, which means it enables the model to learn from an unlabeled training dataset. Based on the unlabeled dataset, the unsupervised learning model 540 can predict the output. Using an unsupervised learning system 500B, the unsupervised learning model 540 can learn hidden patterns from the dataset by itself without any supervision. In various embodiments, unsupervised learning models 540 are often utilized to perform tasks involving clustering, association rule learning, and/or dimensional reduction.

Clustering is an unsupervised learning technique that involves clustering or grouping the available data points into different clusters based on similarities and/or differences. The objects or data points with the most similarities remain in the same group, and they have no or very few similarities from other groups. Clustering algorithms can be used in a variety of different tasks such as, but not limited to image segmentation, statistical data analysis, market segmentation, and the like. Some commonly used clustering algorithms that can be selected include K-means Clustering, hierarchal Clustering, DBSCAN, etc.

Association rule learning is an unsupervised learning technique which finds unique relations among variables within a large data set. In many embodiments, a primary aim of this type of learning algorithm is to find the dependency of one data item on another data item and map those variables accordingly so that it can satisfy some desired outcome. This algorithm can be applied in market basket analysis, web usage mining, continuous production, etc. However, those skilled in the art will recognize that other scenarios may be available based on the desired application. Some popular algorithms of association rule learning are Apriori Algorithm, Eclat, and FP-growth algorithm.

In additional embodiments, the number of features/variables present in a dataset can be understood as the dimensionality of the dataset, and the technique used to reduce the dimensionality is known as a dimensionality reduction technique. Although more data provides more accurate results, it can also affect the performance of the model/algorithm, such as yielding overfitting outcomes, etc. In such cases, dimensionality reduction techniques can be utilized. It is often desired that this process involves converting the higher dimensions dataset into lesser dimensions dataset while also ensuring that the ensuing results provide similar information. Different dimensionality reduction methods can be utilized, such as, but not limited to, PCA (Principal Component Analysis), Singular Value Decomposition (SVD), etc.

Finally, in the embodiment depicted in FIG. 5, a reinforcement learning system 500C is shown. The reinforcement learning system 500C can be configured with a reinforcement learning model 560 that accepts input data 550 and generates an output 591. In reinforcement learning, the reinforcement learning model 560 learns actions for a given set of states that lead to a goal state. In the embodiment depicted in FIG. 5, a critic 580 can receive or otherwise notice an error 570 within the reinforcement learning model 560 actions, and adjust the outcome/output, by way of a reinforcement signal 590, such that the "reward" or "punishment" is adjusted to better model the future behaviors or processing of the reinforcement learning model 560.

It is a feedback-based learning model that can takes feedback signals after each state or action by interacting with the environment. This feedback works as a reward (positive for each good action and negative for each bad action), and the agent's goal is to maximize the positive rewards to improve their performance. The behavior of the model in reinforcement learning is similar to human learning, as humans learn things by experiences as feedback and interact with the environment. Popular methods of reinforcement learning including q-learning, state-action-reward-state-action (SARSA), and deep Q network.

Q-learning is one of the popular model-free algorithms of reinforcement learning, which is based on the Bellman equation. It often aims to learn the policy that can help the AI agent to take the best action for maximizing the reward under a specific circumstance. It can incorporate Q values for each state-action pair that indicate the reward to following a given state path, and it tries to maximize that Q-value.

SARSA is an on-policy algorithm based on the Markov decision process. In many embodiments, it can use the action performed by the current policy to learn the Q-value. The SARSA algorithm stands for State Action Reward State Action, which symbolizes the tuple (s, a, r, s', a'). Finally, deep Q neural networking (or DQN) is Q-learning within a neural network. It can be deployed within a big state space environment where defining a Q-table would be a complex task. So, in these embodiments, rather than using a Q-table, the neural network instead utilizes Q-values for each action based on the state.

Although a specific embodiment for different methods of machine-based learning suitable for carrying out the various steps, processes, methods, and operations described herein is discussed with respect to FIG. 5, any of a variety of systems and/or processes may be utilized in accordance with embodiments of the disclosure.

Figure 6:
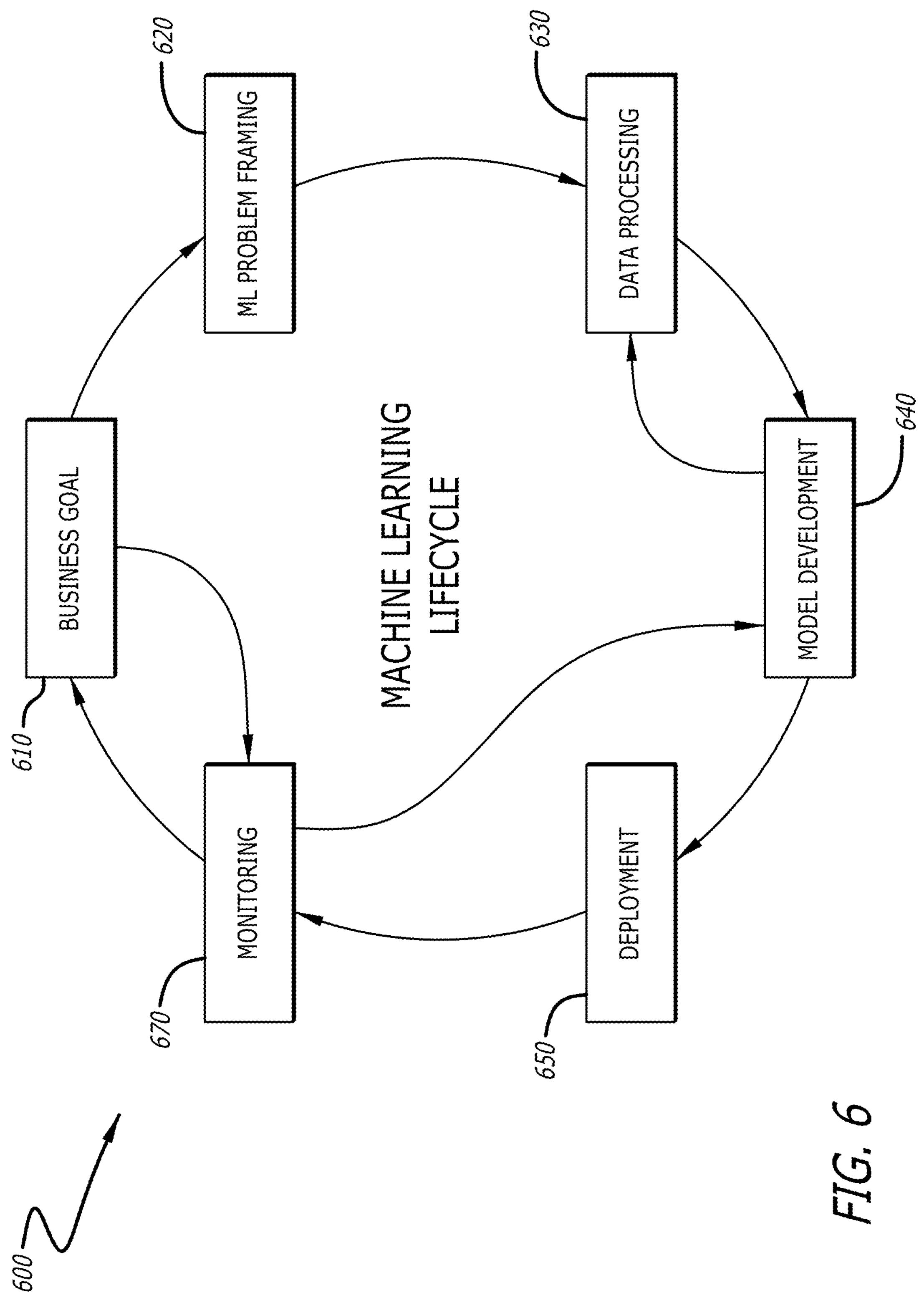
FIG. 6 is an illustration of a machine learning lifecycle in accordance with various embodiments of the disclosure.

Referring to FIG. 6, a machine learning lifecycle 600 in accordance with various embodiments of the disclosure is shown. During the development of machine learning systems, the embodiment depicted in FIG. 6 can provide a framework for how to structure the design and maintenance of these systems. This machine learning lifecycle 600 outlines various stages involved in building, deploying, and improving ML models to solve real-world problems. By following this structured process, businesses and organizations can ensure that their machine learning projects align with strategic goals, use data effectively, and adapt to changing conditions over time. This machine learning lifecycle 600 emphasizes that developing a machine learning model is not a one-time effort but an iterative process requiring ongoing monitoring and adjustment. The feedback loop inherent in the machine learning lifecycle 600 allows for continual refinement and optimization of models to maintain their accuracy and relevance.

In many embodiments, a first stage of the machine learning lifecycle 600 is identifying the business goal 610, which sets the overall direction and purpose of the ML project. This can involve understanding the specific problems or opportunities within the business or project that machine learning can address. A clear business goal 610 ensures that the project remains focused on delivering tangible value, such as improving LLM-assisted customer service by improving the results generated by the LLM. Without a well-defined goal, it can be challenging to align the subsequent stages of the ML lifecycle 600, as the choice of model, data processing methods, and performance metrics can all depend on what the business aims to achieve.

Establishing a proper business goal 610 can also involve engaging with key stakeholders and developers to gather requirements and set success criteria. It can provide a roadmap that outlines what success looks like and helps in framing the ML problem. For example, if the goal is to maximize utilization rate of network devices with low carbon footprint, the project might focus on building a predictive model that assigns a higher weightage to carbon footprint and the utilization rate. Clearly defined goals not only help guide the project but also provide benchmarks for evaluating the effectiveness of the deployed model once it enters production.

Once the business goal 610 is established, various embodiments take a next step involving ML problem framing 620, wherein the goal is translated into a specific machine learning task. This can involve selecting the appropriate type of ML problem, such as classification, regression, clustering, or recommendation, and defining the target variables or outputs. Proper problem framing can be important as it determines the particular data requirements, choice of model, and evaluation metrics.

During this stage, it is also prudent to consider the constraints and assumptions that may affect the model's development. This might include data availability, computational resources, ethical considerations, or regulatory compliance. Properly framing the problem ensures that the model development aligns with the business's needs and that the problem is broken down into manageable steps, ultimately increasing the project's chances of success.

Data processing 630 is a step in many embodiments where raw data is collected, cleaned, and transformed into a format suitable for machine learning. This step can involve gathering data from various sources, removing errors or inconsistencies, handling missing values, and normalizing or scaling features to ensure that the model can learn effectively. Feature engineering is often a part of this stage, where new features are derived from the raw data to capture more relevant information and improve model performance.

The quality and preparation of the utilized data can significantly impact the model's accuracy and reliability. Inadequate or poorly processed data can lead to biased or inaccurate predictions, no matter how advanced the model is. Hence, data processing 630 can require or at least benefit from careful planning and iterative refinement. Once the data is processed, it is typically split into training, validation, and test sets to develop and evaluate the model, ensuring that it generalizes well to new, unseen data.

Model development 640 is a phase in a number of embodiments where machine learning algorithms are selected, trained, and refined to create a model that addresses the framed problem. This stage can involve choosing the appropriate algorithm (e.g., decision trees, neural networks, support vector machines), setting up the model's architecture, and defining hyperparameters that will guide the training process. The model is trained on the processed data to identify patterns and relationships that allow it to make predictions or decisions.

During model development 640, the model can be evaluated using the validation dataset to fine-tune its parameters and improve performance. Techniques like cross-validation, regularization, and hyperparameter tuning can be used to prevent overfitting and ensure the model generalizes well. If proper steps are taken, the result is a model that, once it meets predefined performance metrics, is ready for deployment in a real-world environment. However, this process often involves several iterations to optimize the model for the specific business goal, indicated by the arrow back to data processing 630.

In further embodiments, deployment 650 is the stage where the developed model is integrated into the production environment to perform its intended tasks. This phase may involve setting up the necessary infrastructure, such as APIs or cloud-based services, to allow the model(s) to process live data and generate predictions. Deployment 650 can transform the model from a research tool into a functional component of a business process or product, providing real-time insights, automations, or decisions.

Proper deployment 650 can also include setting up mechanisms for logging, error handling, and user access. Since real-world environments are often dynamic and differ from training conditions, deployment may require continuous adaptation and updates to ensure the model(s) operates efficiently. This step can be important because a model's success is not only determined by its performance metrics but also by its ability to provide actionable results that align with the business goal 610.

In more embodiments, monitoring 670 is the ongoing process of tracking the model's performance and behavior after deployment. It involves collecting data on the model's predictions, accuracy, latency, and error rates to detect issues such as concept drift, where changes in the underlying data patterns can degrade the model's accuracy. By continuously monitoring 670, teams can identify when the model's performance drops and requires retraining or adjustments to align with the evolving data.

Monitoring 670 can also encompass aspects like user feedback, security, and compliance, ensuring that the model remains effective, reliable, and ethical in its application. It may serve as the feedback loop in the lifecycle, where insights gained from monitoring feed back into the earlier stages, particularly data processing 630 and model development 640, to refine the model(s) as needed. This iterative process allows the machine learning system to adapt and maintain its alignment with the original business goal 610 over time.

Although a specific embodiment for a machine learning lifecycle 600 suitable for carrying out the various steps, processes, methods, and operations described herein is discussed with respect to FIG. 6, any of a variety of systems and/or processes may be utilized in accordance with embodiments of the disclosure. For example, the particular route of development of the model(s) may not follow this cycle completely.

Figure 7:
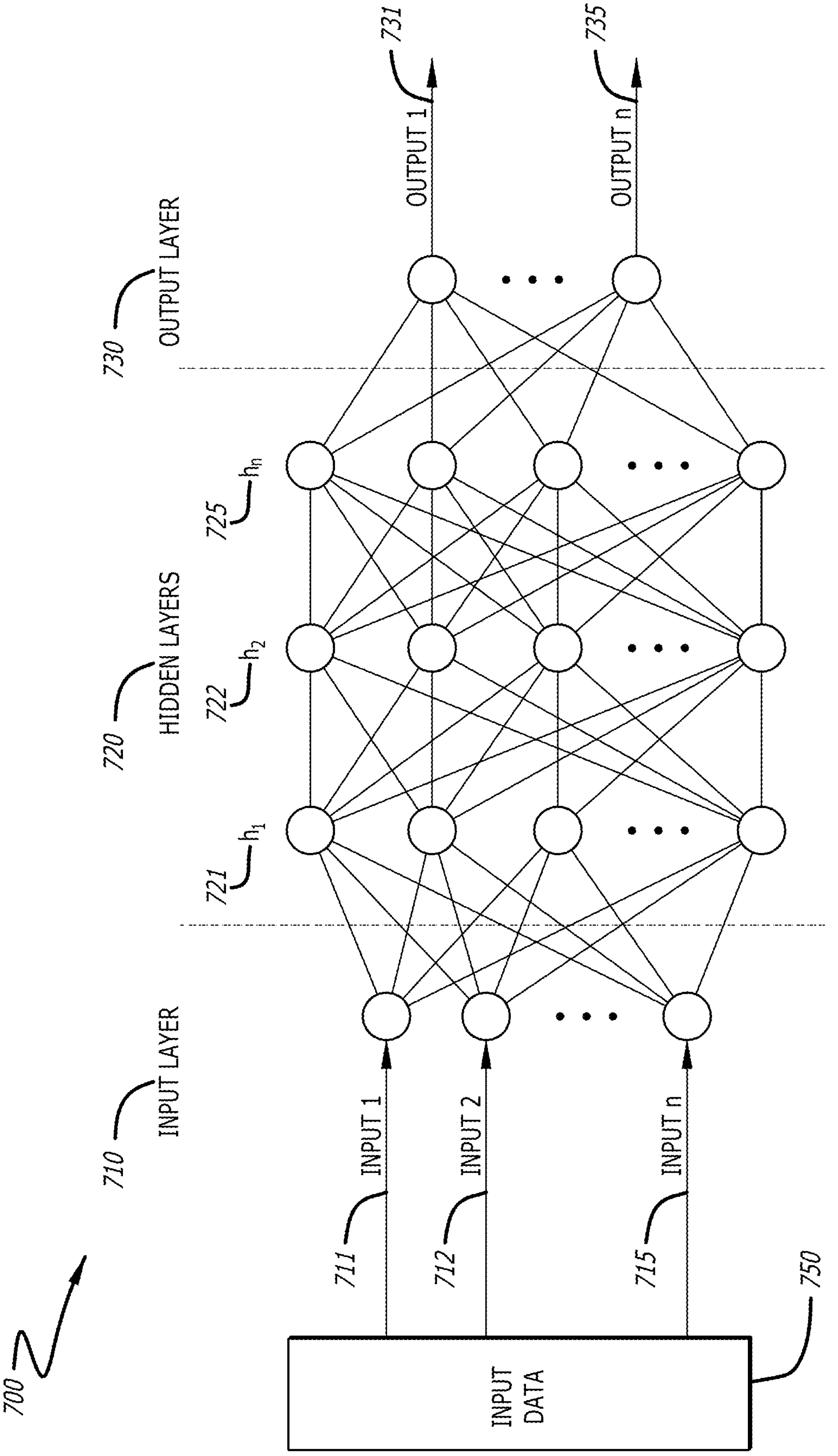
FIG. 7 is an exemplary neural network in accordance with various embodiments of the disclosure.

Referring to FIG. 7, an exemplary neural network 700 in accordance with various embodiments of the disclosure is shown. The embodiment depicted specifically depicts a feedforward neural network with multiple layers. This type of network consists of an input layer 710, one or more hidden layers 720, and an output layer 730. Each layer contains nodes (or neurons) that are interconnected, representing how data flows through the network. The input layer 710 can receive raw data, which is then processed by the hidden layers 720 through weighted connections and activation functions. These hidden layers 720 can enable the network to learn complex patterns and relationships within the data.

The final output layer 730 produces the network's predictions or classifications based on the processed input. The interconnected nature of the nodes allows the neural network 700 to learn from data during training by adjusting the weights of connections to minimize prediction errors. This structure is the foundation of deep learning models, as adding more hidden layers 720 can create a deep neural network, capable of tackling highly complex tasks such as image recognition, natural language processing, and pattern detection in large datasets.

A perceptron or a single artificial neuron is the building block of artificial neural networks (ANNs) and can perform forward propagation of information. For a set of inputs to the perceptron, weights (and biases to shift wights) can be assigned. These inputs and weights can be multiplied out correspondingly together to get a sum output. Those skilled in the art will recognize tools such as, but not limited to, PyTorch, Tensorflow, and MXNet as training packages for common neural network tasks. However, it is contemplated that other tools may be developed specifically for the neural network tasks related to the embodiments described herein.

In additional embodiments, the weight matrices of a neural network can be initialized randomly or obtained from a pre-trained model. These weight matrices can be multiplied with the input matrix (or output from a previous layer) and subjected to a nonlinear activation function to yield updated representations, which are often referred to as activations or feature maps. The loss function (also known as an objective function or empirical risk) can often be calculated by comparing the output of the neural network and the known target value data.

Feedforward networks, such as the neural network 700 depicted in the embodiment of FIG. 7, are often configured as neural networks where information moves in one direction, from the input layer through the hidden layers to the output layer, without any cycles or loops. They are primarily used for tasks such as classification, regression, and simple pattern recognition, where each input is processed independently of others. In contrast, backpropagation is not a separate type of network but rather a training algorithm commonly used in both feedforward and other types of networks, like recurrent neural networks (RNNs).

Backpropagation involves adjusting the weights of the network in the reverse direction (from output to input) based on the error between the predicted output and the actual target during training. While feedforward describes the structure and data flow within the network, backpropagation is a technique used to optimize the model. Feedforward networks are ideal for straightforward tasks where input-output relationships are not sequential or time-dependent. However, for problems involving learning complex patterns over time, networks that leverage backpropagation for training, like RNNs or deep feedforward networks with many hidden layers, become necessary to capture these intricate dependencies.

Typically, in these network arrangements, the weights are iteratively updated via various methods including, but not limited to, stochastic gradient descent algorithms in order to help minimize the loss function until the desired accuracy is achieved. Most modern deep learning frameworks can facilitate this by using reverse-mode automatic differentiation to obtain the partial derivatives of the loss function with respect to each network parameter through recursive application of the chain rule. Colloquially, this is also known as backpropagation. Common gradient descent algorithms can include, but are not limited to, Stochastic Gradient Descent (SGD), Adam, Adagrad etc. The learning rate is an important parameter in gradient descent. Except for SGD, all other methods use adaptive learning parameter tuning. Depending on the objective such as classification or regression, different loss functions such as Binary Cross Entropy (BCE), Negative Log Likelihood Loss (NLLL) or Mean Squared Error (MSE) can be used.

Neural network architecture is commonly used for a wide range of tasks in fields such as computer vision, natural language processing, financial forecasting, and materials science. For instance, it can be employed to recognize patterns in images, such as identifying objects or faces, or to classify text into categories, like spam detection in emails. It is also useful in regression problems, such as predicting stock prices or energy consumption, where input features can be processed to output continuous values. However, this is a general example of an artificial intelligence (AI) model, illustrating how a feedforward neural network works. Depending on the problem, other methods and models may be more appropriate. For example, convolutional neural networks (CNNs) are often used for image processing tasks, while recurrent neural networks (RNNs) are suitable for sequential data like time series data or text. Additionally, simpler models like linear regression, decision trees, or support vector machines (SVMs) may be sufficient if the problem is less complex, or the dataset is relatively small. The embodiment depicted in FIG. 7 is presented as an exemplary ML solution that may be deployed within one or more methods or systems described herein.

In many embodiments, the input layer 710 is the first layer in a neural network 700 and serves as the initial point where raw data is introduced into the model. Each node (or neuron) in this layer represents an individual feature or variable from the dataset, allowing the network to receive and process various types of data, such as pixel values in an image, numerical features (e.g., KPIs of network device) in a spreadsheet, or words in a text document. The number of nodes in the input layer directly depends on the number of features present in the dataset. If there are one-hundred features in the data, the input layer will typically have one-hundred nodes, each conveying one piece of the information to the subsequent layers. In more embodiments, the inputs of the neural network 700 are generally scaled i.e., normalized to have a zero mean and/or unit standard deviation. Scaling can also be applied to the input of hidden layers (using batch or layer normalization) to improve the stability of neural network 700.

Unlike the hidden layers 720 and output layers 730, the input layer 710 typically does not perform any computations or transformations on the data. Its primary function is often to pass the input data to the next layer in the network, the first hidden layer 721. However, it is often desired that the data fed into this layer is preprocessed appropriately, such as being normalized or standardized, to ensure that the neural network can learn efficiently. Proper preprocessing, like scaling numerical values or encoding categorical variables, can help the network process data uniformly, facilitating more stable and faster convergence during training.

The input layer's design depends on the nature of the problem. For example, in natural language processing, the input layer may represent words encoded as numerical vectors, while in time-series analysis, each node might represent a data point in a sequence. While the input layer 710 itself does not modify the data, it sets the stage for the neural network to extract complex patterns and relationships through the deeper layers. This flexibility in handling various types of input make the neural network 700 a powerful tool for a diverse set of applications.

With respect to the embodiments described herein, the input layer may be configured with a plurality of inputs providing data 750. For example, a model can be configured with a first input 711 configured as a user query, a second input 712 is configured with a first data representation from the context data store, while additional inputs can be added related to the number of data representations. The nth input 715 can be configured in certain embodiments to include an $N^{th}$ attribute. Those skilled in the art will recognize that the inputs can be configured to include various data.

In a number of embodiments, the neural network 700 comprises a plurality of hidden layers 720. The embodiment depicted in FIG. 7 comprises a first hidden layer 721, a second hidden layer 722, and an nth hidden layer 725, which are denoted as $h_1$, $h_2$, and $h_n$ respectively. In many embodiments, the hidden layers 720 are where the core of the model's learning and pattern recognition occurs. In each hidden layer, individual neurons receive inputs from the previous layer, apply a set of weights, add a bias, and pass the result through an activation function (e.g., ReLU, leaky ReLU, sigmoid, hyperbolic tangent (tanh), Swish, etc.). This process can introduce non-linearity, allowing the network to capture complex patterns in the data that simple linear models cannot. The intricate web of connections among neurons across layers helps the network transform and process input features into representations that become progressively more abstract and useful for making predictions.

The first hidden layer 721 $h_1$ receives direct input from the input layer, transforming the raw data into an initial set of features. For example, in an image recognition task, this layer might begin identifying basic patterns, such as edges or simple textures. The output of the first hidden layer 721 is then passed to a second hidden layer 722 $h_2$, which builds upon the features identified by the first hidden layer 721. This deeper layer might start recognizing more complex patterns, such as shapes or specific object components, by combining the lower-level features identified earlier. This can continue on until a last, nth hidden layer 725 $h_n$ continues this abstraction process, allowing the network to recognize even higher-level, more detailed features, such as identifying an entire object within an image or understanding intricate relationships in the input data.

Each hidden layer adds a level of complexity and abstraction to the network's learning capabilities. The multi-layer structure can enable the network to move from recognizing simple patterns in the first input layer 721 to highly complex, abstract concepts in the deeper layers. The number of hidden layers and neurons within them can vary depending on the problem's complexity. More hidden layers generally allow the network to model more intricate functions, making deep neural networks especially effective for tasks like image recognition, natural language processing, and complex predictive modeling. However, adding more layers also increases the computational demand and the risk of overfitting, highlighting the need to carefully design and tune these hidden layers for optimal performance.

In various embodiments, the output layer 730 is often the final layer in a neural network and is responsible for producing the network's predictions or classifications based on the information processed through the previous hidden layers 720. Each neuron in the output layer 730 can represent a specific outcome or category that the model can predict. In the embodiment depicted in FIG. 7, the outputs are labeled as "output 1" 731 to "output n" 735, indicating that the network can be designed to have a varying number of outputs depending on the nature of the problem being solved for. For example, in a binary classification task, there would typically be a single output neuron that provides a probability score for one of the two classes/outcomes. In contrast, for multi-class classification, the output layer would contain multiple neurons, each corresponding to a different class.

The number of neurons in the output layer 730 can also designed specifically for other types of tasks, such as regression, where the model can predict continuous values. In such cases, the output layer 730 might contain a single neuron representing a numerical prediction, such as the price of a house or the temperature forecast, etc. Alternatively, in complex applications like multi-label classification (where each input can belong to multiple classes simultaneously), the output layer 730 could have multiple neurons, each representing a different class, with each neuron outputting a probability of the input belonging to that specific class.

The activation function used in the output layer can vary based on the desired output. For binary classification, a sigmoid function is commonly used to produce a probability between 0 and 1. For multi-class classifications, a softmax function can be applied to output a set of probabilities that sum to 1, indicating the most likely class. For regression problems, a linear activation function is often used to output a continuous range of values. The flexibility in designing the output layer allows the neural network 700 to be applied to a wide variety of tasks, from simple binary decisions to complex multi-output predictions, making them a versatile tool in artificial intelligence and machine learning.

In several additional embodiments, a system may utilize the neural network 700 to generate responses to user queries. Over time, the neural network 700 can adjust routing algorithms based on feedback.

Although a specific embodiment for an exemplary neural network suitable for carrying out the various steps, processes, methods, and operations described herein is discussed with respect to FIG. 7, any of a variety of systems and/or processes may be utilized in accordance with embodiments of the disclosure. For example, real-world neural networks are often far more complex, featuring many more layers, nodes, and connections than the simplified structure shown in the embodiment depicted in FIG. 7, which is an illustrative example meant to make it easier to explain the basic concepts of neural networks and how they process information.

Figure 8A:
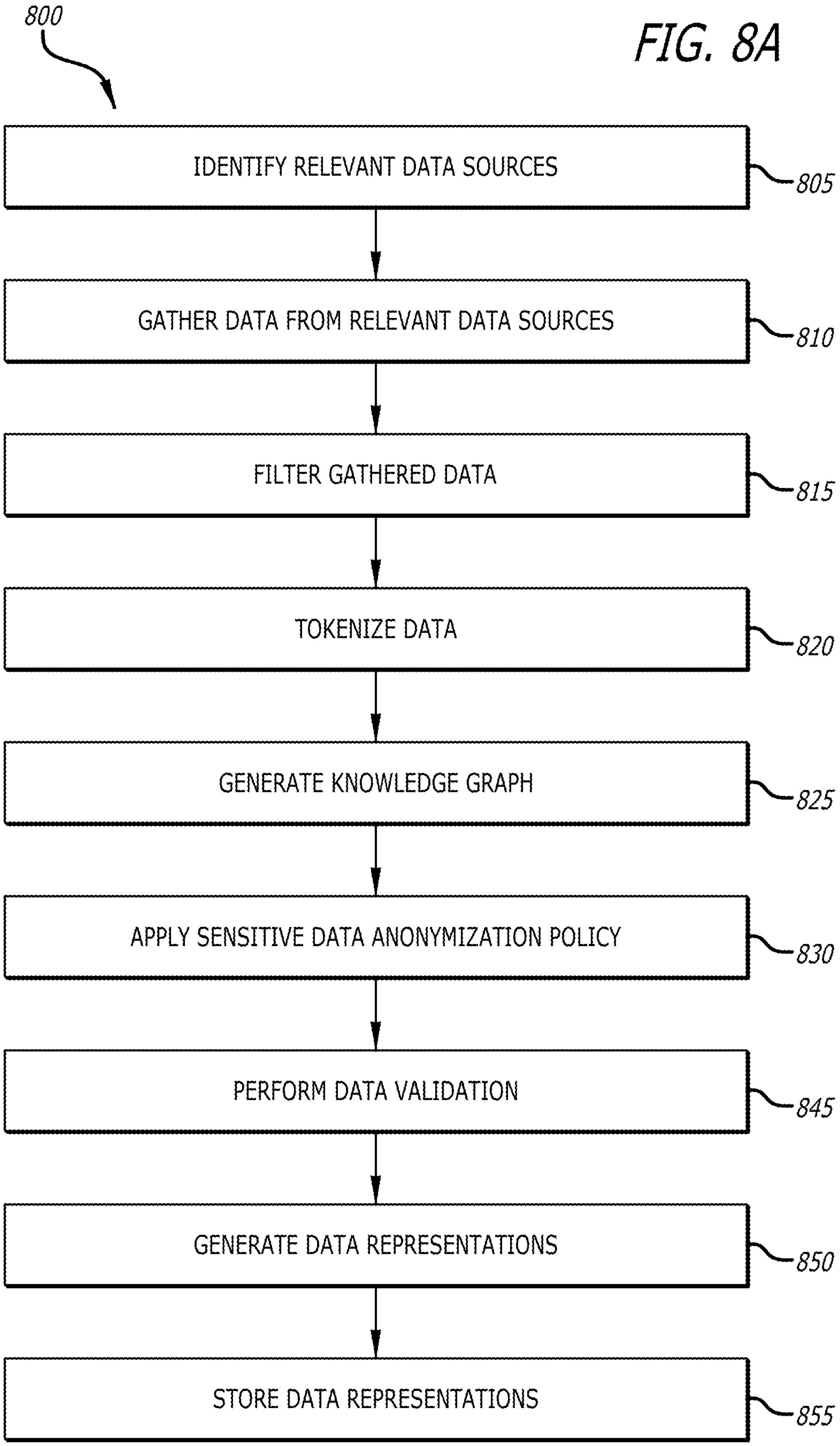
FIG. 8A is a flowchart depicting a process for generating data representations in accordance with various embodiments of the disclosure.

Referring to FIG. 8A, a flowchart depicting a process 800 for generating data representations in accordance with various embodiments of the disclosure is shown. The process may be performed by a security augmentation logic, for example. However, some or all steps may be performed by other entities or components. In addition, some embodiments may perform the steps in parallel, perform the steps in different orders, perform a subset of the described steps, or perform additional steps, without departing from the principles set forth herein. Some or all components described below and/or some or all steps described below may be part of the secure augmentation logic, part of the enterprise system, hosted on cloud infrastructure provided by a hyperscaler, and/or may be local to a particular device, depending upon the embodiment.

The security augmentation logic identifies relevant data sources (block 805). For example, the security augmentation logic may access one or more data sources identified as relevant data sources by a user. In some embodiments, the security augmentation logic crawls a general source of data, such as devices comprising the enterprise system of FIG. 1, and identifies particular data sources at the general source of data based on a data relevance policy. The data relevance policy may include one or more rules for identifying a particular data source as relevant, such as one or more keyword match rules where particular data sources that include one or more keywords are identified as relevant data sources, or one or more data type rules where particular data sources that include one or more data types are identified as relevant data sources. In some embodiments, the data relevance policy includes a domain classification AI model, which when applied to a particular data source generates a classification of the particular data source as either corresponding to a particular domain or not. In some embodiments, the security augmentation logic identifies data sources corresponding to various domains as relevant.

The security augmentation logic gathers data from the relevant data sources (block 810). In some embodiments, the security augmentation logic copies the relevant data sources to a central repository, such as a data lake. Alternatively, the security augmentation logic may simply access the relevant data sources as needed when performing other steps of the process, such as generating the knowledge graph. The gathered data may comprise sensitive data, e.g., sensitive data relating to one or more customers of an organization implementing the security augmentation logic.

In some embodiments, the security augmentation logic filters the gathered data (block 815). In various embodiments, the security augmentation logic gathers (block 810) all data from the relevant data sources and then filters the gathered data to remove irrelevant data, e.g., data that does not correspond to a particular domain. The filtering may be performed by the security augmentation logic using the data relevance policy. For example, the domain classification AI model of the data relevance policy may be employed by the security augmentation logic to determine portions of the gathered data that correspond to the particular domain, and the security augmentation logic adds those portions of the gathered data to the central repository. Alternatively or additionally, the domain classification AI model of the data relevance policy may be employed by the security augmentation logic to determine portions of the gathered data that do not correspond to the particular domain, and the security augmentation logic removes or excludes those portions of the gathered data from the central repository. After filtering, the remaining gathered data may be considered a relevant subset of the gathered data.

In some embodiments, the filtering (block 815) performed by the security augmentation logic alternatively or additionally includes filtering the gathered data to exclude non-useful data. For example, the security augmentation logic may apply a portion of the data relevance policy to the gathered data to score some or all of the gathered data, such as data of a particular type, and compare the scores to a threshold score. The security augmentation logic may remove from the gathered data a subset of gathered data with scores that do not meet the threshold score. As a particular example, the gathered data may include service tickets from a customer service database. Each service ticket may have a satisfaction attribute representing customer satisfaction. The security augmentation logic may compare the satisfaction attribute of each service ticket to a satisfaction threshold in the data relevance policy and remove or exclude from the central repository any service tickets that do not meet or exceed the satisfaction threshold.

The security augmentation logic tokenizes the gathered data (or, in some embodiments, the subset of gathered data that remains after filtering) (block 820). Tokenizing the gathered data breaks down and standardizes the gathered data into a structured form, specifically tokens, to make subsequent processing more efficient and performant. Depending upon the embodiment, the tokenization may be performed using any of a variety of techniques, including whitespace tokenization, regular expression tokenization, the application of one or more tokenizer algorithms, etc. In various embodiments, when tokenizing the gathered data, the security augmentation logic also applies one or more named entity recognition algorithms and/or performs relationship extraction, such as dependency parsing, to identify entities, relationships among entities, and/or other attributes of entities in the gathered data. In some embodiments, entities, relationships among entities, and/or other attributes of entities are alternatively or additionally identified by the security augmentation logic in the gathered data when generating the knowledge graph. The tokens and any related data are stored in the central repository and/or other data storage, such as a non-relational database.

The security augmentation logic generates a knowledge graph based on the tokens (block 825). The knowledge graph includes nodes representing entities and edges connecting nodes that represent relationships between the connected entities. The knowledge graph may also include other attributes of entities, which may be stored at a node as a literal attribute, as described above. As such, the knowledge graph encodes information, such as relational information, relating to a variety of entities found in the gathered data. The security augmentation logic may generate the knowledge graph using any of a variety of algorithms, such as a resource description framework, an ontology-based construction tool, or functions of a graph database service.

Figure 8B:
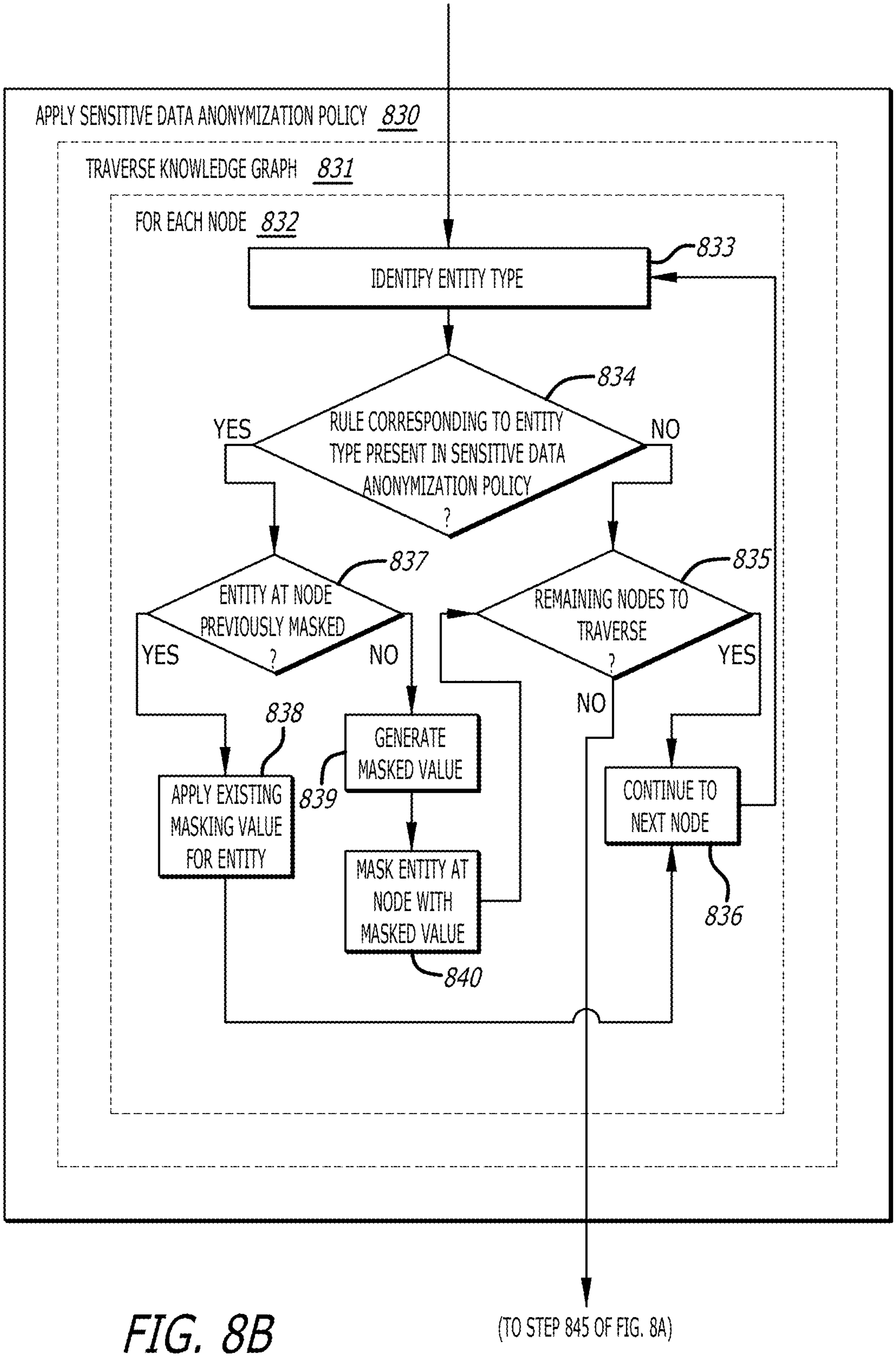
FIG. 8B is a flowchart depicting a process for applying the sensitive data anonymization policy in accordance with various embodiments of the disclosure.

Now referring to FIG. 8B, which shows one embodiment of applying the sensitive data anonymization policy, the security augmentation logic applies the sensitive data anonymization policy to the generated knowledge graph to produce a consistently anonymized knowledge graph (block 830). Although a particular technique for applying the sensitive data anonymization policy is described below (e.g., block 830), a person of skill in the art will recognize that other techniques for applying the sensitive data anonymization policy can be practiced without departing from the scope and spirit of the present disclosure.

In applying the sensitive data anonymization policy (block 830), the security augmentation logic traverses the knowledge graph (block 831). Traversal of the knowledge graph can be performed according to any of a variety of graph traversal algorithms, such as a breadth-first search technique or a depth-first search technique. As the security augmentation logic traverses the knowledge graph, for each node (block 832), the security augmentation logic performs some or all of the following steps (blocks 833-840). The security augmentation logic identifies an entity type of the entity represented by the node (block 833). The security augmentation logic determines whether a rule corresponding to the identified entity type is present in the sensitive data anonymization policy (block 834). If not, the security augmentation logic determines whether there are remaining nodes to traverse (block 835). If not, the security augmentation logic continues to the logic described at block 845. If there are one or more remaining nodes to traverse, the security augmentation logic continues to the next node (block 836).

If the security augmentation logic determines there is a rule corresponding to the identified entity type present in the sensitive data anonymization policy, the security augmentation logic determines whether the entity represented by the node has previously been masked (block 837). For example, if the node corresponds to entity "Customer A," the security augmentation logic determines whether a masking value has already been generated for a different node representing "Customer A." If the entity has previously been masked, the security augmentation logic applies the existing masked value to the node to replace the entity (e.g., the entity identifier, such as "Customer A") with the respective existing masked value for the entity (block 838). If the security augmentation logic determines that the entity represented by the node has not previously been masked, the security augmentation logic employs the corresponding rule of the sensitive data anonymization policy to generate a masked value for the entity (block 839). Depending upon the embodiment, the masked value may be different from all other masked values previously generated by the secure augmentation logic while traversing the knowledge graph. The secure augmentation logic masks the entity at the node with the newly generated masked value (block 840). The secure augmentation logic then determines whether there are remaining nodes to traverse (block 835). If so, the secure augmentation logic continues to the next node (block 836), otherwise the secure augmentation logic continues to the logic of block 845 of the process.

Returning to FIG. 8A, in some embodiments, the secure augmentation logic performs data validation on the consistently anonymized knowledge graph (block 845). In other embodiments, the secure augmentation logic does not perform data validation (block 845) on the consistently anonymized knowledge graph and proceeds from the logic of block 830 to the logic of block 850. The data validation performed by the secure augmentation logic (block 845) can include a data quality check and/or a data security check. The data quality check can include the secure augmentation logic employing any of a variety of tools to perform an ontology consistency check, a cardinality validation, a data completeness check, a data consistency check, a referential integrity check, a value range and format check, and/or a semantic validation and inference check, etc., to validate the quality of the data in the consistently anonymized knowledge graph. The data security check can include the security augmentation logic employing any of a variety of tools to perform a regulatory compliance check and/or to verify whether each entity corresponding to sensitive data was properly masked according to the sensitive data anonymization policy. If the consistently anonymized knowledge graph does not satisfy the data validation, the secure augmentation logic can send an alert to a user, attempt to repair the consistently anonymized knowledge graph, and/or restart the process, at any of the preceding steps.

In various embodiments, the secure augmentation logic generates data representations based on the consistently anonymized knowledge graph (block 850). Depending upon the embodiment, the data representations can be any format of data representation that can be applied to an AI model. In some embodiments, the data representations are vector embeddings, and the secure augmentation logic applies the consistently anonymized knowledge graph to an embedding model, resulting in a set of vector embeddings. The secure augmentation logic stores the data representations in a data store, such as the central repository and/or another data store (block 855). For example, in embodiments where the data representations are vector embeddings, the secure augmentation logic may store the vector embeddings in the central repository and/or a vector database.

Figure 9A:
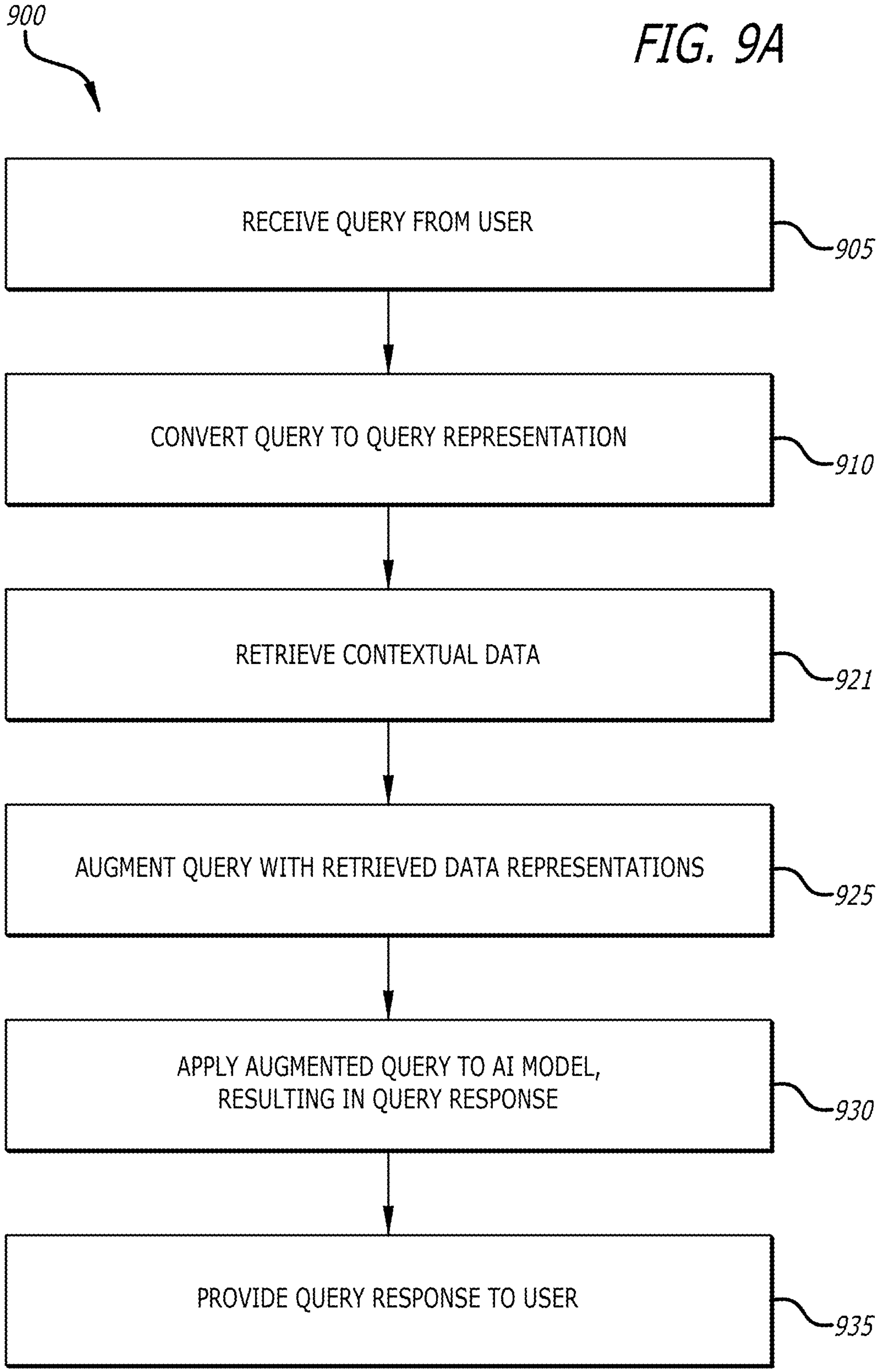
FIG. 9A is a flowchart depicting a process for augmenting a user query in accordance with various embodiments of the disclosure.

Referring to FIG. 9A, a flowchart 900 depicting a process for augmenting a user query in accordance with various embodiments of the disclosure is shown. The process may be performed by a generative artificial intelligence system, for example. However, some or all steps may be performed by other entities or components. In addition, some embodiments may perform the steps in parallel, perform the steps in different orders, perform a subset of the described steps, or perform additional steps, without departing from the principles set forth herein. Some or all components described below and/or some or all steps described below may be part of the secure augmentation logic, part of the generative AI system, part of the enterprise system, hosted on cloud infrastructure provided by a hyperscaler, and/or may be local to a particular device, depending upon the embodiment.

In various embodiments, the generative AI system receives a query, or prompt, from a user (block 905). For example, the generative AI system may include a cloud-based generative AI service that exposes a chat-based interface via an API over a network. The query includes one or more query parameters, such as text, images, audio, video, hyperlinks, and/or other data. In various embodiments, the generative AI system coverts the query into a query representation (block 910). In some embodiments, the generative AI system applies the one or more query parameters to the same embedding model as was used to generate the set of data representations based on the knowledge graph. The embedding model outputs the query representation, which may be a vector embedding.

Figure 9B:
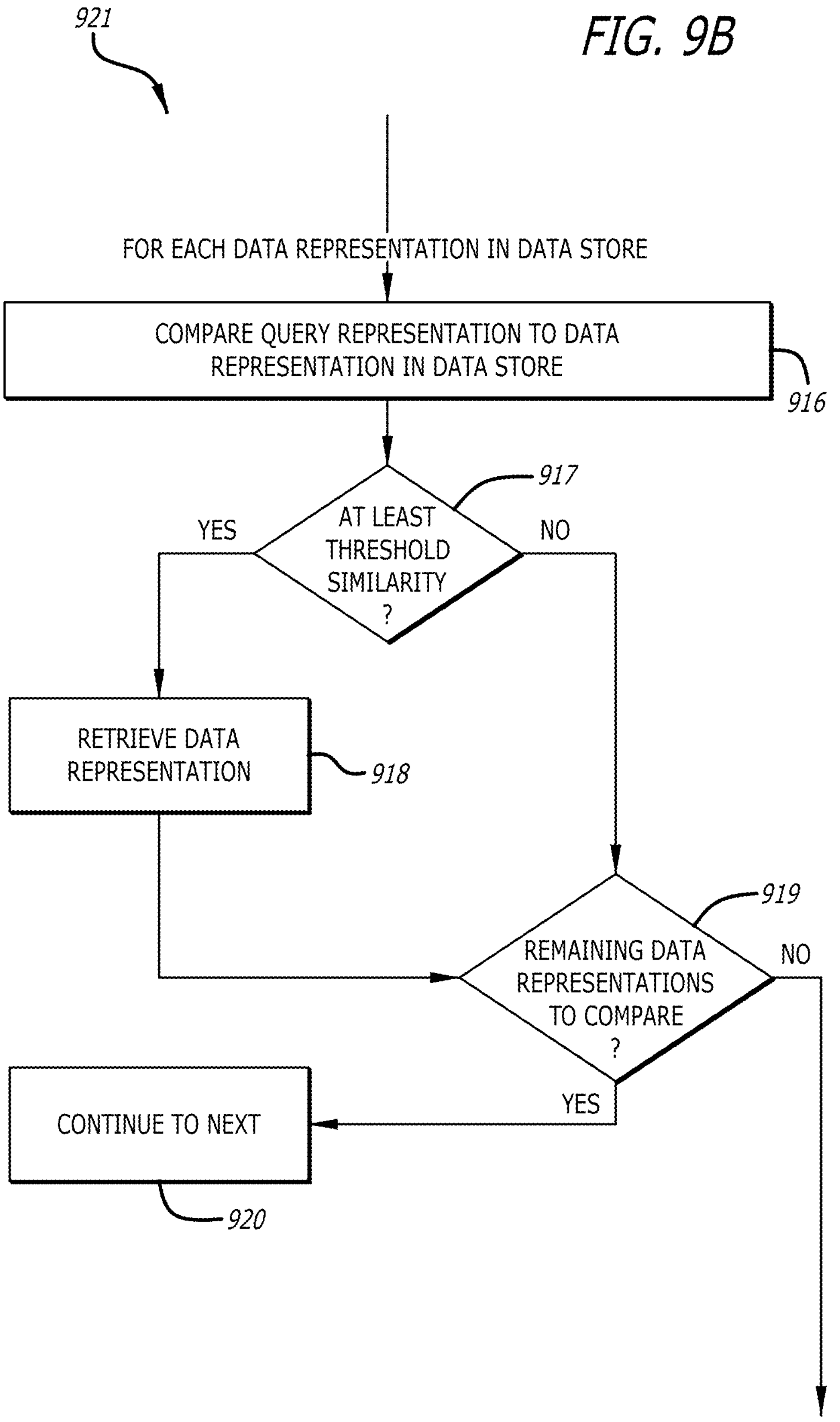
FIG. 9B is a flowchart depicting a process for retrieving contextual data in accordance with various embodiments of the disclosure.

Referring to FIG. 9B, a flowchart depicting a process for retrieving contextual data in accordance with various embodiments of the disclosure is shown. A person of skill in the art will recognize that some or all steps may be performed by other entities or components. In addition, some embodiments may perform the steps in parallel, perform the steps in different orders, perform a subset of the described steps, or perform additional steps, without departing from the principles set forth herein. In some embodiments, the process for augmenting a user query of FIG. 9A may employ an entirely different process for retrieving contextual data than that described with reference to FIG. 9B.

In various embodiments, the generative AI system retrieves contextual data (block 921), comprising relevant data representations from the context data store. The generative AI system includes a retrieval-augmented generation service that is communicatively coupled with the context data store, such as through an API over a network. In some embodiments, the context data store is local to the generative AI system, such as in embodiments where the generative AI system is local to a single device. In retrieving relevant data representations from the context data store, the generative AI system performs some or all of the logic of blocks 916-920, and may do so via the retrieval-augmented generation service.

In various embodiments, the generative AI system, for each data representation in the context data store, compares the query representation to the data representation (block 916). The generative AI system may employ any of a variety of techniques to compare the query representation to the data representation. In various embodiments, the generative AI system determines a distance measurement between the query representation and the data representation, such as a Euclidian distance, a cosine similarity, a Manhattan distance, a Hamming distance or a Jaccard Similarity. In other embodiments, the generative AI system may employ other techniques to determine a distance measurements.

In various embodiments, the generative AI system determines whether the distance measurement is within a threshold distance (block 917). If so, the generative AI system retrieves the data representation (block 918) and then determines whether there are any remaining data representations for comparison to the query representation (block 919). If the distance measurement is not within the threshold distance, the generative AI system does not retrieve the data representation and instead determines whether there are there are any remaining data representations for comparison to the query representation (block 919). In either case, if there is one or more remaining data representations, the generative AI system continues to the next data representation in the context data store (block 920), and if there are not any remaining data representations, the generative AI system continues to a next portion of logic, e.g., augmentation (block 925) as described below.

Returning to FIG. 9A, in various embodiments, the generative AI system augments the query with the retrieved data representations (block 925). In various embodiments, the retrieved data representations and/or references to the data representations, such as links, are added to the query. This may include the generative AI system editing the query to add the retrieved data representations, the generative AI system generating a new query that includes the retrieved data representations, or the generative AI system simply applying the retrieved data representations to a generative AI model along with the query.

In various embodiments, the generative AI system applies the augmented query to a generative AI model, such as a large language model (block 930). The generative AI model produces a query response based on the augmented query. The query response may include text, image data, audio data, video data, hyperlinks, and/or other data. In various embodiments, the query response answers a question contained in the query. The generative AI system provides the augmented query to the user (block 935). Depending upon the embodiment, this may include presenting the query response via a user interface on a display of a user device, sending the query response for display via a user interface at a remote user device, and/or storing the query response in a particular data storage.

Figure 10:
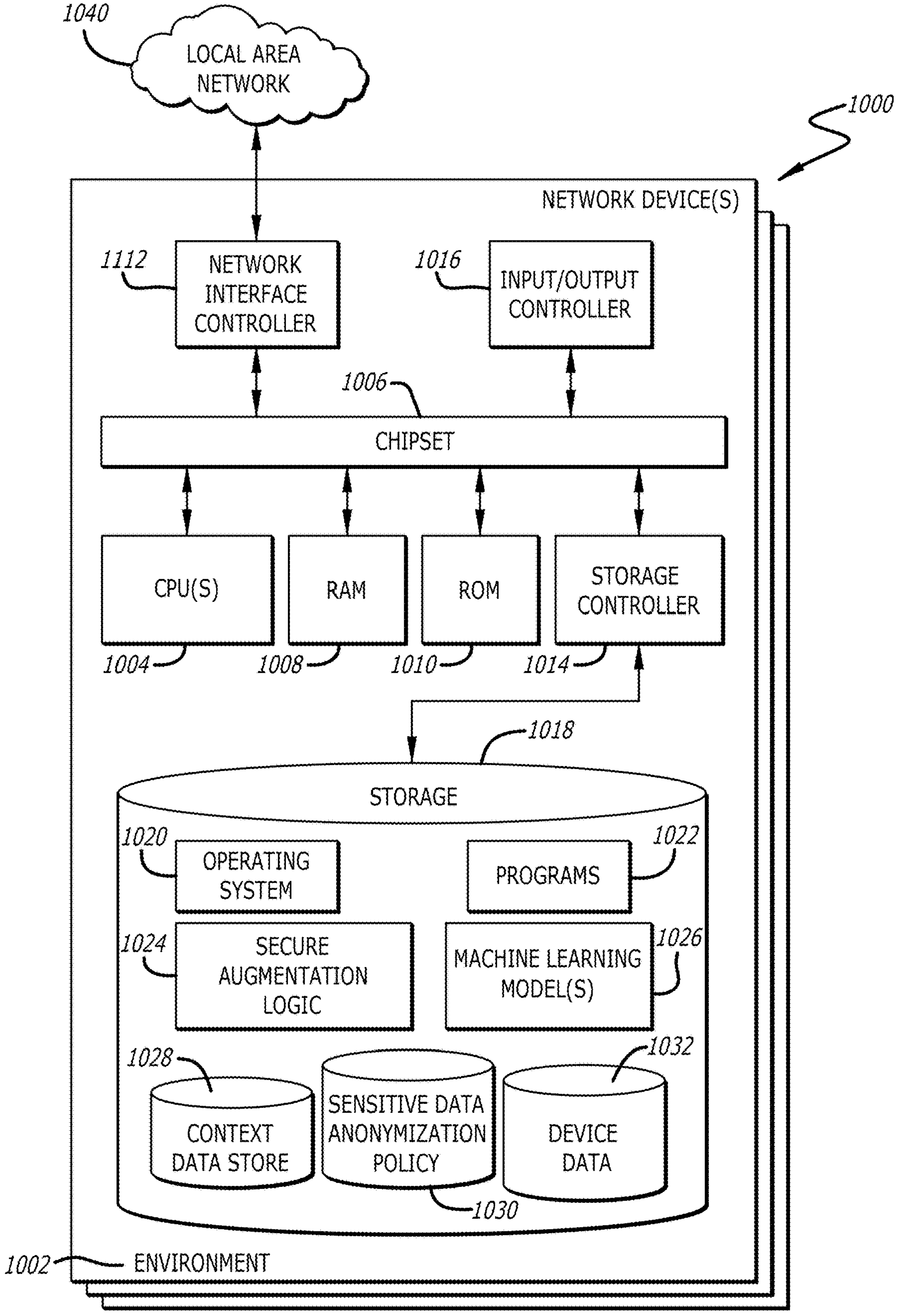
FIG. 10 is a block diagram of a device suitable for configuration with a secure augmentation logic in accordance with various embodiments of the disclosure.

Referring to FIG. 10, a block diagram of a device suitable for configuration with a secure augmentation logic in accordance with various embodiments of the disclosure is shown. The embodiment of the conceptual block diagram depicted in FIG. 10 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 10 can also illustrate an access point, a switch, or a router in accordance with various embodiments of the disclosure. The device 1000 may, in many nonlimiting examples, correspond to physical devices or to virtual resources described herein. For example, in some embodiments, the device 1000 may be a set of devices, such as a collection of servers of a hyperscaler that collectively provide cloud services, such as hosting the secure augmentation logic.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In a number of embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Additional embodiments of the device 1000 can be configured to operate in a networked environment using logical connections to remote computing devices and computer systems through a network, such as the network 1040. The chipset 1006 can include functionality for providing network connectivity through a network interface card ("NIC") 1112, which may comprise a gigabit Ethernet adapter or similar component. The NIC 1112 can be capable of connecting the device 1000 to other devices over the network 1040. It is contemplated that multiple NICs 1112 may be present in the device 1000, connecting the device to other types of networks and remote systems.

In further embodiments, the device 1000 can be connected to a storage 1018 that provides non-volatile storage for data accessible by the device 1000. The storage 1018 can, for instance, store an operating system 1020, programs 1022, a context data store 1028, a sensitive data anonymization policy 1030, and device data 1032 which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

In many more embodiments, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement. By way of example, and not limitation, computer-readable storage media can include volatile and non-volatile, removable and non-removable media implemented in any method or technology.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In many additional embodiments, the storage 1018 or other computer-readable storage media is encoded with computer-executable instructions which, when loaded into the device 1000, may transform it from a general-purpose computing system into a special-purpose computer capable of implementing the embodiments described herein. These computer executable instructions may be stored as program 1022 (for example, an application) and transform the device 1000 by specifying how the processor(s) 1004 can transition between states, as described above. In some embodiments, the device 1000 has access to computer-readable storage media storing computer executable instructions which, when executed by the device 1000, perform the various processes described above with regard to FIGS. 1-17. In certain embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10 and can include other components that are not explicitly shown in FIG. 10 or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many further embodiments, the device 1000 may include a secure augmentation logic 1024. The secure augmentation logic 1024 can be configured to perform one or more of the various steps, processes, operations, and/or other methods that are described above. Often, the secure augmentation logic 1024 can be a set of instructions stored within a non-volatile memory that, when executed by the processor(s) 1004 can carry out these steps, etc. In numerous embodiments, the secure augmentation logic 1024 may perform various operations related to securing sensitive data for use in a RAG process. In some embodiments, the device 1000 can be a server device. In such embodiments, the secure augmentation logic 1024 may be configured to receive sensitive data related to a plurality of entities. The secure augmentation logic 1024 may generate a knowledge graph based on the sensitive data. The knowledge graph may encode relationships among the plurality of entities. The secure augmentation logic 1024 may consistently anonymize one or more entities of the plurality of entities in the knowledge graph according to a sensitive data anonymization policy, resulting in a consistently anonymized knowledge graph. The secure augmentation logic 1024 may generate a set of data representations based on the consistently anonymized knowledge graph. The secure augmentation logic 1024 may store the set of data representations in a context data store.

A RAG process, as part of a generative AI system, may receive a prompt to an AI model. The prompt, otherwise called a user query, may include a query parameter. The RAG process may apply the query parameter to the context data store to retrieve contextual data that includes one or more data representations of the set of data representations. The RAG process may augment the user query based on the contextual data before applying the user query to the AI model. Application of the user query, with the contextual data, to the AI model may produce a higher quality query response than would be generated without the contextual data. In this manner, the secure augmentation logic enables the use of sensitive data with an AI model without compromising the proprietary information within the sensitive data. Depending upon the embodiment, the RAG process may be local to the machine hosting the context data store, or may be on a different machine. In embodiments of the latter case, the RAG process may access the context data store via an application programming interface, or any other suitable technique.

In various embodiments, the storage 1018 can include the content data store 1028. The content data store 1028 may be a vector database or other data storage system to store the set of data representations. In various embodiments, the data representations are vector embeddings representing relationship knowledge indicated by the consistently anonymized knowledge graph. In some embodiments, the content data store 1028 can include text strings or chunks of text generated by the secure augmentation logic 1024, where each text string describes in plain language relationship knowledge indicated by the consistently anonymized knowledge graph, or text strings or chunks of text copied from one or more data sources.

In still more embodiments, the storage 1018 can include the sensitive data anonymization policy 1030. The sensitive data anonymization policy 1030 may include the set of rules and/or heuristics to consistently anonymize entities within a knowledge graph. In various embodiments, the sensitive data anonymization policy 1030 is formatted as a JSON or XML document. In other embodiments, the sensitive data anonymization policy 1030 is captured within program code of the secure augmentation logic 1024, e.g., program code that, when executed, performs block 830 as described with reference to FIGS. 8A-B.

In a number of embodiments, the storage 1018 can include device data 1032. The device data 1032 may refer to machine-specific data of the device 1000, such as locally stored files. In various embodiments, the device data 1032 can be gathered by the secure augmentation logic 1024, e.g., as part of block 810 of FIG. 8A. In various embodiments, the device data 1032 can include sensitive data, such as a user of the device's PII, or organizational data, such as data pertaining to a service ticket submitted via the device.

Finally, in numerous additional embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026.

The ML model(s) 1026 can be configured to generate inferences to make predictions or draw conclusions from data. An inference can be considered the output of a process of applying a model to new data. This can occur by learning from at least enterprise data as described above, and utilizing the learning to produce output, such as textual output. For example, the ML model(s) 1026 can be utilized for determining responses to prompts that have been augmented using a RAG process that employs the context data store. To train the ML model 1026, a training dataset of a corpus of text documents can be utilized. This data is used to train the ML model(s) 1026, allowing it to learn relevant patterns.

Once trained, the ML model 1026 may be integrated into the device 1000 to make real-time responses to prompts received from users, such as customer service technicians. To generate a response, the trained model can take input data and produce a prediction or a decision. The input data can be in various forms, depending upon the embodiment, such as images, audio, text, or numerical data, depending on the type of problem the model was trained to solve. The output of the model can also vary depending on embodiment and the problem, such as text and/or numerical data.

Although a specific embodiment for a device suitable for configuration with a secure augmentation logic for carrying out the various steps, processes, methods, and operations described herein is discussed with respect to FIG. 10, any of a variety of systems and/or processes may be utilized in accordance with embodiments of the disclosure. For example, the device may be in a virtual environment such as a cloud-based network administration suite, or it may be distributed across a variety of devices.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A server device, comprising:
- a processor; and
- a non-transitory computer-readable memory communicatively coupled to the processor, wherein the memory comprises a secure augmentation logic that is configured to:
  - receive sensitive data related to a plurality of entities;
  - generate a knowledge graph based on the sensitive data, wherein the knowledge graph encodes relationships among the plurality of entities;
  - anonymize one or more entities of the plurality of entities in the knowledge graph according to a sensitive data anonymization policy, resulting in a consistently anonymized knowledge graph;
  - generate a set of data representations based on the consistently anonymized knowledge graph; and
  - store the set of data representations in a context data store;
  - wherein applying, to the context data store, a query parameter of a user query to a generative artificial intelligence system, results in:
    - retrieval of contextual data comprising one or more data representations of the set of data representations; and
    - augmentation of the user query based on the contextual data.

2. The server device of claim 1, wherein the sensitive data is received from a plurality of sources, and the secure augmentation logic is further configured to:
- consolidate the sensitive data into a single set of sensitive data; and
- identify a relevant subset of sensitive data of the single set of sensitive data that corresponds to a particular domain, wherein generating the knowledge graph is based on the relevant subset of sensitive data.

3. The server device of claim 2, wherein identifying the relevant subset of sensitive data comprises filtering the single set of sensitive data to exclude from the relevant subset of sensitive data a second subset of sensitive data that scores below a threshold score corresponding to a particular attribute of the sensitive data.

4. The server device of claim 1, wherein the sensitive data is received from a plurality of sources, and one source of the plurality of sources comprises a customer service database.

5. The server device of claim 1, wherein anonymizing each entity of the one or more entities comprises using a same masked value to mask the entity at each representation of the entity in the knowledge graph, and each entity of the one or more entities corresponds to a different masked value.

6. The server device of claim 1, wherein the context data store is a vector database, and the set of data representations comprises a set of vector embeddings.

7. The server device of claim 1, wherein the query parameter comprises a set of text data.

8. The server device of claim 1, wherein the generative artificial intelligence system comprises a large language model that produces a query response when the user query and the contextual data are applied.

9. The server device of claim 1, wherein the secure augmentation logic is further configured to validate the consistently anonymized knowledge graph, the validating comprising a data quality check and a data security check;
- wherein generating the set of data representations is responsive to the validating.

10. A method of consistently anonymized retrieval augmented generation, the method comprising:
- generating a knowledge graph based on sensitive data related to a plurality of entities, wherein the knowledge graph encodes relationships among the plurality of entities;
- anonymizing one or more entities of the plurality of entities in the knowledge graph according to a sensitive data anonymization policy, resulting in a consistently anonymized knowledge graph;
- generating a set of data representations based on the consistently anonymized knowledge graph; and
- storing the set of data representations in a context data store;
- wherein applying, to the context data store, a query parameter of a user query to a generative artificial intelligence system, results in:
  - retrieval of contextual data comprising one or more data representations of the set of data representations; and
  - augmentation of the user query based on the contextual data.

11. The method of claim 10, further comprising:
- identifying a relevant subset of sensitive data that corresponds to a particular domain.

12. The method of claim 11, wherein identifying the relevant subset of sensitive data comprises filtering the sensitive data to exclude from the relevant subset of sensitive data a second subset of sensitive data that corresponds to a particular data type.

13. The method of claim 10, wherein the sensitive data is received from a plurality of sources, and one source of the plurality of sources comprises a healthcare database.

14. The method of claim 10, wherein anonymizing each entity of the one or more entities comprises using a same masked value to mask the entity at each representation of the entity in the knowledge graph, and each entity of the one or more entities corresponds to a different masked value.

15. The method of claim 10, wherein the set of data representations comprises a set of chunks of text.

16. The method of claim 10, wherein the query parameter comprises a textual prompt to answer a question relating to the sensitive data.

17. The method of claim 10, wherein the generative artificial intelligence system comprises a large language model that is deployed at a device that performs the method.

18. The method of claim 10, further comprising:

performing a data quality check;

wherein generating the set of data representations is responsive to the data quality check.

19. A query server comprising:

a processor; and a non-transitory computer-readable storage medium storing instructions that, when executed by the processor, instruct the query server to:

receive a query parameter corresponding to a user query to a generative artificial intelligence service;

retrieve contextual data from a context data store based on the query parameter, wherein the retrieved contextual data comprises one or more data representations of a set of data representations stored by the context data store, wherein the set of data representations are generated based on a consistently anonymized knowledge graph that encodes relationships among a plurality of entities within a set of sensitive data, and wherein one or more entities of the plurality of entities represented in the consistently anonymized knowledge graph is consistently anonymized according to a sensitive data anonymization policy; and send the contextual data to the generative artificial intelligence service as an augmentation to the user query.

20. The query server of claim 19, wherein consistently anonymizing each entity of the one or more entities comprises using a same masked value to mask the entity at each representation of the entity in the knowledge graph, and each entity of the one or more entities corresponds to a different masked value.

* * * * *